US006464585B1

(12) United States Patent
Miyamoto et al.

(10) Patent No.: US 6,464,585 B1
(45) Date of Patent: Oct. 15, 2002

(54) SOUND GENERATING DEVICE AND VIDEO GAME DEVICE USING THE SAME

(75) Inventors: Shigeru Miyamoto, Kyoto (JP); Yoichi Yamada, Kyoto (JP); Eiji Onozuka, Kyoto (JP); Koji Kondo, Kyoto (JP); Yoji Inagaki, Kyoto (JP); Tsuyoshi Kihara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/554,728

(22) PCT Filed: Nov. 19, 1988

(86) PCT No.: PCT/JP98/05188

§ 371 (c)(1),
(2), (4) Date: May 18, 2000

(87) PCT Pub. No.: WO99/27519

PCT Pub. Date: Jun. 3, 1999

(30) Foreign Application Priority Data

Nov. 20, 1997 (JP) ............................................ 9-338076

(51) Int. Cl.$^{7}$ ................................................ A63F 13/00
(52) U.S. Cl. ........................................... 463/35; 463/30
(58) Field of Search ............................ 463/35, 30, 31, 463/32, 36, 37, 38, 43, 44

(56) References Cited

U.S. PATENT DOCUMENTS

| | | | |
|---|---|---|---|
| 4,272,649 A | | 6/1981 | Pfeiffer |
| 4,314,236 A | | 2/1982 | Mayer et al. |
| 5,052,685 A | | 10/1991 | Lowe et al. |
| 5,095,798 A | | 3/1992 | Okada et al. |
| 5,406,022 A | | 4/1995 | Kobayashi |
| 5,457,668 A | | 10/1995 | Hibino et al. |
| 5,556,107 A | | 9/1996 | Carter |
| 5,592,609 A | | 1/1997 | Suzuki et al. |
| 5,613,909 A | | 3/1997 | Stelovsky |
| 5,680,533 A | | 10/1997 | Yamato et al. |
| 5,680,534 A | | 10/1997 | Yamato et al. |
| 5,768,393 A | | 6/1998 | Mukojima et al. |
| 5,993,318 A | | 11/1999 | Kousake |
| 6,115,036 A | | 9/2000 | Yamato et al. |
| 6,149,523 A | * | 11/2000 | Yamada et al. ............... 463/31 |

FOREIGN PATENT DOCUMENTS

| | | | | |
|---|---|---|---|---|
| JP | 55-55391 | | 4/1980 | |
| JP | 59-1268 | | 1/1984 | |
| JP | 63-44869 | | 11/1988 | |
| JP | 6-149247 | | 5/1994 | |
| JP | 6-165878 | | 6/1994 | |
| JP | 07034894 U | * | 6/1995 | ............. A63F/9/22 |
| JP | 7-152369 | | 6/1995 | |
| JP | 7-31276 | | 7/1995 | |
| JP | 07031276 Y2 | * | 7/1995 | .......... G10H/1/053 |
| JP | 2526527 | | 6/1996 | |

OTHER PUBLICATIONS

Pham, Alex, "Music Takes on a Hollywood Edge," *Los Angeles Times* (Dec. 27, 2001).

* cited by examiner

*Primary Examiner*—Michael O'Neill
*Assistant Examiner*—Julie Brocketti
(74) *Attorney, Agent, or Firm*—Nixon & Vanderhye P.C.

(57) ABSTRACT

When any of push-button switches on a handheld controller is pressed in a sound input mode, a video game machine generates and temporarily stores frequency data of a tone corresponding to the depressed switch. When a joystick on the controller is tilted to a predetermined direction, the video game machine changes the generated frequency data according to the amount of tilt of the joystick. It is therefore possible to input various sounds in tone using a limited number of switches. The frequency data stored in the video game machine is read later to be converted into audio signals, and outputted from a speaker incorporated in a CRT display. When a melody based on the inputted sound coincides with a predetermined melody set, the video game machine makes various changes in the progress of the game. For example, a hero character can be warped to a position that is different from the present position, or provided with various items.

19 Claims, 21 Drawing Sheets

DETAILS ABOUT IMAGE DATA AREA 24

BACKGROUND OBJECT PROCESSING S4

DISPLAY EXAMPLE OF SOUND INPUT MODE (S520 THROUGH S527)

DISPLAY EXAMPLE DURING AUTO PLAY (S530)

FREE PLAY PROCESSING S550

SOUND GENERATING DEVICE AND VIDEO GAME DEVICE USING THE SAME

FIELD OF THE INVENTION

The present invention relates to sound generation and video games using the same and, more specifically, to a sound generating device which plays music based on tone data inputted with a video game machine controller and a video game providing music play based on inputs from a player in relation to the progress of a game.

BACKGROUND AND SUMMARY OF THE INVENTION

Video games have long been able to produce sounds and music in response to player inputs. As a conventional example of video games that generate sound (or music), game software "Mario Paint" has been marketed by NINTENDO. In "Mario Paint", a musical staff is displayed on a screen. Symbols for specifying notes, tone qualities, or the like are written in the musical staff by operating a controller, and thereby inputting sounds to be generated. Other example video games also generate sounds. For example, in many games, when a switch is pressed for specifying an operation or motion such as a missile firing, a jump of a character, or punching of a character, a sound effect corresponding to that operation or motion (missile firing sound, sound effects representing jump, punch, or the like) is generated based on a program. In still another example, background music is generated in accordance with changes in game screens. Further, conventional examples of electronic toys that deal with sound include an electronic musical instrument (keyboard instrument) with a keyboard having key switches corresponding to tones.

As described above at least some, sound generation for use in conventional video games (including video games for a game-dedicated machine and for a personal computer) display a musical staff. This requirement generally makes the program complicated. Also, the operation of inputting sounds or notes is generally not easy, and these devices are not generally of the type that generate the sound of the tone according to key input by a player. Further, the electronic instruments with a keyboard generally can generate only the sound that corresponds to the switch being pressed. Therefore, such instruments require as many key switches as the tones in a required range. It is typically difficult to input sounds with a smaller number of switches. For complicated sound variation, these electric instruments generally become complicated in construction and thus expensive. Furthermore, in the conventional video games with a sound generating function, sound or music generated through the operation by the player generally does not change or have an effect on the progress of the game.

Therefore, a preferred example embodiment of the present invention provides a sound generating device enabling generation of sounds of tones or music that generally cannot be expressed with a limited small number of switches.

Further, a preferred example embodiment provides a sound generating device enabling generation of sounds of a complicated scale or music using a simple construction.

Still another aspect of a preferred example embodiment is to provide a video game device enabling a player to input sounds and play music at will with a game machine controller having a small number of switches, and to use the music in relation to the progress of a game.

Further, it is possible to realize a video game device enabling a player to input sounds and play music at will with a game machine controller and also to relate the sounds or music to the progress of the game. That is, it is possible not only to generate a sound by pressing a button but also to finely adjust a tone through the operation of a joystick, thereby allowing generation of various sounds or music at will.

One aspect of a preferred exemplary embodiment of the present invention is directed to a sound generating device to which sounds of different tones are inputted and which generates the inputted sounds by specifying the tones with a controller having a plurality of push-button switches and an analog joystick capable of selecting among a plurality of positions. A push-button detection part detects one of the plurality of push-button switches that is pressed. A tone selection part selects a tone corresponding to the push-button detected by the push-button detection part. A tilt amount detection part detects an amount of tilt of the analog joystick. A frequency generation part generates a frequency corresponding to the tone selected by the tone selection part with or without change, based on the amount of tilt detected by the tilt amount detection part and the push-button switch detected by the push-button detection part. An audio signal generation part generates a signal of a sound of the tone corresponding to the frequency generated by the frequency generation part.

As described above, in accordance with this aspect, the audio signal having the frequency corresponding to the pressed push-button is generated with or without change. Therefore, it is possible to generate sounds (or music) of different tones using a limited number of push-button switches.

According to a further aspect, When the tilt amount detection part does not detect the amount of tilt of the analog joystick, the frequency generation part generates the frequency corresponding to the tone selected by the tone selection part without change. When the tilt amount detection part detects the amount of tilt of the analog joystick, the frequency generation part generates the frequency corresponding to the tone selected by the tone selection part with change according to the detected amount of tilt.

As described above, the frequency of the audio signal corresponding to the pressed push-button is changed according to the amount of tilt of the analog joystick. Therefore, adjusting the amount of change is easy.

According to a further aspect, the frequency generation part comprises:

- a frequency data generation part generating frequency data corresponding to the push-button switch of the tone selected by the tone selection part;
- a frequency data storage part temporarily storing a plurality of frequency data; and
- a read/write part reading the frequency data stored in the frequency data storage part or writing the frequency data generated by the frequency data generation part in the frequency data storage part.

When the tilt amount detection part does not detect the amount of tilt of the analog joystick, the read/write part writes in the frequency data storage part a digital value equivalent to the frequency corresponding to the tone selected by the tone selection part, as the frequency data. when the tilt amount detection part detects the amount of tilt of the analog joystick, the read/write part writes in the frequency data storage part a digital value equivalent to a frequency obtained by changing the frequency corresponding to the tone selected by the tone selection part according to the detected amount of tilt, as the frequency data.

As described above, in accordance with this aspect, the frequency data corresponding to the pressed push-button switch with or without change is temporarily stored in the frequency data storage part, and later read out for use. Therefore, it is not required to operate an operation part in real time according to music play, thereby allowing easy operation to specify tones.

According to a further aspect, the frequency generation part raises the frequency of the tone within a predetermined tone range as the analog joystick is tilted to one direction; and lowers the frequency of the tone within a predetermined tone range as the analog joystick is tilted to another direction.

As described above, in accordance with this aspect, the frequency of the tone is raised or lowered according to the tilting direction of the analog joystick. This enables the operator to intuitively relate the changing directions of the analog joystick and the frequency of the tone to each other and therefore to easily perform operation for changing the frequency.

According to a further aspect, the sound generating device further comprises a vibrato part for changing a depth value of vibrato according to the amount of tilt detected by the tilt amount detection part, and the frequency generation part generates a frequency corresponding to the tone selected by the tone selection part with vibrato added thereto based on the depth value from the vibrato part.

As described above, in accordance with this aspect, the depth value of vibrato added to the sound of the selected tone is changed according to the amount of tilt of the analog joystick. Therefore, it is possible to realize quite amusing sound effects.

A still further aspect is directed to a sound generating device to which sounds of different tones are inputted, and generating music based on the inputted sounds, by specifying the tones with a controller having a plurality of push-button switches and an analog joystick capable of selecting among a plurality of positions. A push-button detection part detects one of the plurality of push-button switches that is pressed. A tone selection part selects a tone corresponding to the push-button detected by the push-button detection part. A tilt amount detection part detects an amount of tilt of the analog joystick. A frequency data generation part generates frequency data corresponding to the tone selected by the tone selection part with or without change, based on the amount of tilt detected by the tilt amount detection part and the pressed push-button switch detected by the push-button detection part. A frequency data storage part temporarily stores a plurality of frequency data. A write part periodically and sequentially writes the frequency data generated by the frequency data generation part in the frequency data storage part. A read part sequentially reads the frequency data stored in the frequency data storage part. An audio signal generation part generates an audio signal having a frequency corresponding to the frequency data read by the read part.

As described above, in accordance with this aspect, an audio signal having the frequency corresponding to the pressed push-button is generated with or without change. It is therefore possible to generate sounds of various tones (or music) using a limited number of push-button switches. Further, the frequency of the audio signal corresponding to the pressed push-button is changed according to the amount of tilt of the analog joystick. Therefore, the amount of change is easily adjusted. Still further, the frequency data corresponding to the pressed push-button switch with or without change is temporarily stored in the frequency data storage part, and later read out for use. Therefore, real time operation of the operation part according to music play is not required, allowing easy operation to specify tones even if the user is not accustomed to the operation of the operation part.

According to a further aspect, the read part repeatedly reads the frequency data of a predetermined time period stored in the frequency data storage part to generate music composed by a player as background music. As described above, the data of the inputted tones can be used as background music.

A still further aspect is directed to a video game device displaying an image on a display device and producing sound from a speaker by executing a game program. An operation part having a plurality of push-button switches instructs motion of a player-object on a screen of the display device. An analog joystick is capable of selecting among a plurality of positions and instructs a moving direction of the player-object through operation. A player-object image data generation part generates data for displaying an image of the player-object. A non-player-object image data generation part generates data for display an image of an object except the player-object. A push-button detection part detects one of the plurality of push-button switches that is pressed. A tone selection part selects a tone corresponding to the push-button detected by the push-button detection part. A tilt amount detection part detects an amount of tilt of the analog joystick. A frequency data generation part generates frequency data corresponding to the tone selected by the tone selection part with or without change, based on the amount of tilt detected by the tilt amount detection part and the push-button switch detected by the push-button detection part. A frequency data storage part temporarily stores a plurality of frequency data. A write part periodically and sequentially writes the frequency data generated by the frequency data generation part in the frequency data storage part. A read part sequentially reads the frequency data stored in the frequency data storage part. An audio signal generation part generates an audio signal having a frequency corresponding to the frequency data read by the read part. A display image changing part changes at least one of the image data for the player-object generated by the player-object image data generation part and the image data for the non-player-object generated by the non-player-object image data generation part based on the audio signal generated by the audio signal generation part to change at least one of display states of the player-object and the non-player-object.

As described above, in accordance with this aspect, the data of the inputted sound can be used in relation to the progress of the game, thereby achieving an unprecedented amusing video game.

According to a still further aspect, the display image changing part changes the display state of the non-player-object.

According to yet another aspect, the display image changing means changes the display state of the non-player-object by moving the player-object to a scene which differs from a present scene to change a background screen of the player-object. As described above, the display state of the non-player-object can be changed by warping the player-object to another position, for example.

According to a still further aspect, the display image changing part changes the display state of the player-object. Thus, it is possible to change the display state of the player-object so that, for example, a hero character can obtain various items (weapon, key, life, and the like).

According to yet another aspect, the video game device further comprises a predetermined melody determination part determining whether a melody based on the frequency data sequentially read from the read part is a predetermined melody, and a display image changing part that changes at least one of the display states of the player-object and the non-player-object in response to determination by the predetermined melody determination part that the melody is the predetermined melody.

As described above, at least one of the display states of the player-object and the non-player-object is changed only when the melody based on the inputted sounds is a predetermined melody. It is thus possible to include a melody as an important factor for the progress of the game.

According to yet another aspect, the predetermined melody determination part temporarily stores melody data inputted through operation of the operation part. When new melody data is inputted through an operation of the operation part a predetermined time beforehand, the arrangement compares the new melody data with the melody data previously inputted. When both data has a predetermined relation, the arrangement determines that the melody based on the frequency data sequentially read by the read part is the predetermined melody.

As described above, the melody data inputted through the operation of the operation part is temporarily stored, and later read out for use. Therefore, real time operation of the operation part according to music play is not required, allowing easy operation to specify tones even if the user is not accustomed to the operation of the operation part.

Yet another aspect is directed to a video game device displaying an image on a display device and producing sound from a speaker by executing a game program. An operation part operated by a player and having a plurality of push-button switches instructs motion of a player-object on a screen of the display device. A player-object image data generation part generates data for displaying an image of the player-object. A non-player-object image data generation part generates data for displaying an image of an object except the player-object. A push-button detection part detects one of the plurality of push-button switches that is pressed. A tone selection part selects a tone corresponding to the push-button detected by the push-button detection part. A frequency data generation part generates frequency data corresponding to the tone selected by the tone selection part. A frequency data storage part temporarily stores a plurality of frequency data. A write part for periodically and sequentially writes the frequency data generated by the frequency data generation part in the frequency data storage part. A read part for sequentially reads the frequency data stored in the frequency data storage part. An audio signal generation part generates an audio signal having a frequency corresponding to the frequency data read by the read part. A display image changing part, based on the audio signal generated by the audio signal generation part, changes at least one of the display states of the player-object and the non-player-object by changing at least one of the image data for the player-object generated by the player-object image data generation part and the image data for the non-player-object generated by the non-player-object image data generation part.

As described above, the data of the inputted sound can be used in relation to the progress of the game, allowing an unprecedented amusing video game.

According to still another aspect, the display image changing means changes the display state of the non-player-object by moving the player-object to a scene which differs from a present scene to change a background screen of the player-object. As described above, the display state of the non-player-object can be changed by warping the player-object to another position, for example.

Still another aspect is directed to a recording medium in which a video game program to be executed by an information processing device displays an image for a game on a display device and producing sound for the game from a speaker is stored. The information processing device comprises an operation part operated by a player and having a plurality of push-button switches for instructing motion of a player-object on a screen of the display device. The video game program being or realizing an operational environment on the information processing device, generates data for displaying an image of the player-object in response to an operation of the operation part. The program also generates data for displaying an image of an object except the player-object (non-player-object) in response to an operation of the operation part. The program detects one of the plurality of push-button switches that is pressed and selecting a tone corresponding to the pressed push-button. The program generates frequency data corresponding to the selected tone, and generates an audio signal having a frequency corresponding to the frequency data. The program changes at least one of display states of the player-objects and the non-player-object by changing at least one of the image data for the player-object and the image data for the non-player-object.

As described above, in accordance with this aspect, the game program which uses the data of the inputted sound in relation to the progress of the game can be provided.

BEST MODE FOR CARRYING OUT THE INVENTION

Figure 1:
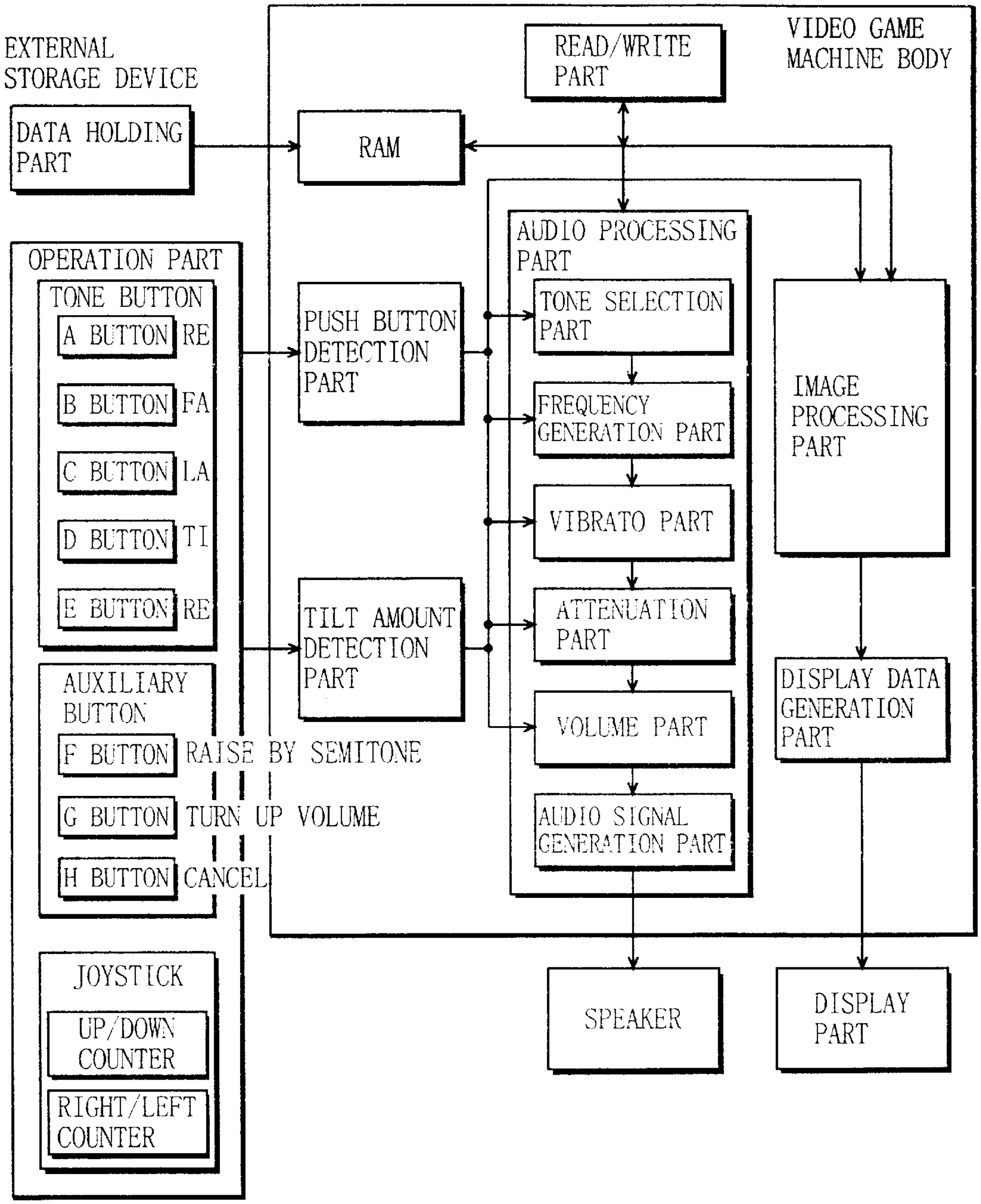
FIG. 1 is a block diagram showing a functional configuration of an exemplary illustrative video game system provided with a sound generating device according to one exemplary embodiment of the present invention.

FIG. 1 is a block diagram showing a functional configuration of a video game system provided with a sound generation device according to one exemplary illustrative embodiment of the present invention.

In FIG. 1, the video game system according to the present embodiment generates sounds as well as provides a video game program executing function provided for conventional general video game systems. That is, the video game system of the present embodiment specifies tones with the use of a game machine controller ("operation part") having a plurality of push-button switches and an analog joystick capable of selecting among a plurality of positions (hereinafter abbreviated as "joystick"), thereby inputting sound data of different tones and generating sounds (or music) based on the inputted sound data.

In the video game system of the present embodiment, a video game machine body, which performs various information processing, includes at least a push-button detection part, a tilt amount detection part, a frequency generation part, and an audio signal generation part.

The push-button switches provided on the operation part of the game machine controller include, for example, switches for tone selection (switches for generating sounds "re", "fa", "la", "ti", and "re" that is an octave higher than the former), and auxiliary switches (a switch for raising the tone selected by the tone selection switch by a semitone, a volume switch for turn up the volume, a switch for canceling a sound input mode to return to a game mode, for example). The joystick includes X-axis and Y-axis photointerrupters to resolve the amount of tilt of a lever in X-axis and Y-axis directions and generate pulses in proportion to the amount of tilt. By supplying pulse signals generated by these photointerrupters to counters to count these signals, the counters generate count values in proportion to the amount of tilt of the joystick.

The push-button detection part detects one switch that is pressed from among the plurality of push-button switches. The tone selection part selects a tone corresponding to the push-button detected by the push-button detection part. The tilt amount detection part detects the amount of tilt of the joystick.

More specifically, the tilt amount detection part detects a tilt angle of the joystick from a neutral position toward a first direction on a scale of 64, for example. When determining based on the amount of tilt detected by the tilt amount detection part that the joystick is located at a neutral position (home position), the frequency generation part generates a frequency corresponding to the tone selected by the tone selection part without any change. On the other hand, when determining based on the amount of tilt detected by the tilt amount detection part that the joystick is located at a position exclusive of the neutral position, the frequency generation part generates a frequency corresponding to the tone selected by the tone selection part with changes according to the amount of tilt of the analog joystick. The audio signal generation part generates a signal of the sound of the tone corresponding to the frequency generated by the frequency generation part. The signal outputted from the audio signal generation part is supplied to a sound producer such as a speaker, which produces the inputted sound.

It is thus possible to input sounds or tones with easy operation by using a game machine controller.

The video game machine body is provided with a vibrato part for generating a variable vibrato sound with easy operation, as required. This vibrato part changes a depth value of vibrato according to the amount of tilt detected by the tilt amount detection part. That is, when the joystick is tilted to a second direction which is different from the above first direction (for example, if the first direction for changing frequency is up/down, the second direction for detecting vibrato is selected to right/left), the vibrato part changes the depth value of vibrato according to the amount of tilt to the second direction. In this case, when determining based on the amount of tilt detected by the tilt amount detection part that the joystick is located at the neutral position, the frequency generation part generates a frequency corresponding to the tone selected by the tone selection part without vibrato. On the other hand, when determining based on the amount of tilt detected by the tilt amount detection part that the joystick is located at a position exclusive of the neutral position, the frequency generation part generates a frequency corresponding to the tone selected by the tone selection part with variation added thereto according to the depth value of vibrato (frequency of the sound with vibrato).

Furthermore, when the joystick is tilted to a certain direction, the amounts of tilt to the first direction (up/down) for specifying the frequency and to the second direction (right/left) for specifying the depth value of vibrato may be resolved and detected, and the amount of change in frequency and the depth value of vibrato may be simultaneously specified. Furthermore, an attenuation part and/or a volume part may be provided to enhance vibrato effects. The attenuation part is used for gradually turning down the volume at predetermined time intervals to smoothly attenuate the volume to 0 when the push-button switch is pressed. The volume part is used for adjusting the volume.

The frequency generation part is constructed of, for example, a frequency data generation part, a frequency data storage part, and a write/read part. The frequency data generation part generates frequency data corresponding to the push-button switch of the tone selected by the tone selection part. The frequency data storage part temporarily stores the frequency data corresponding to the inputted sound or tone. The write/read part writes the frequency data generated by the frequency data generation part in the frequency data storage part or reads the frequency data stored in the frequency data storage part. Further, when the tilt amount detection part does not detect the amount of tilt of the joystick, the write/read part writes a digital value equivalent to the frequency corresponding to the tone selected by the tone selection part in the frequency data storage part as the frequency data. When the tilt amount detection part detects the amount of tilt, the write/read part takes the frequency corresponding to the tone selected by the tone selection part as the reference frequency, changes the reference frequency according to the amount of tilt, and writes the changed reference frequency in the frequency data storage part as the frequency data. The frequency data read by the write/read part from the frequency data storage part is converted by the audio signal generation part into an audio signal having a frequency corresponding to the frequency data.

The video game machine body is further provided with, as required, a player-object image data generation part, a non-player-object image data generation part, and a display image changing part. The player-object image data generation part generates data for displaying an image of a player-object (for example, a hero character) to be operated by the player. The non-player-object image data generation part generates data for displaying an image of a non-player-object (for example, a background screen, still object, and enemy object) that cannot be operated by the player. The display image changing part changes at least one of a display state of the player-object generated by the player-object image data generation part and a display state of the non-player-object generated by the non-player-object image data generation part according to the music generated by the audio signal generation part.

Possible specific examples of changing the display state include changing the display state of the non-player-object, changing the display state of the player-object, and combinations of both. For changing the display state of the non-player-object, various methods can be used. In one method, the background screen where the player-object is present is changed so as to proceed (or to be warped) to another scene or stage that differs from the preceding one. In one method for changing the display state of the player-object, when the player-object obtains an item such as a weapon, plate armor, helmet, part of the player-object image is changed so that the player-object wears the obtained item.

It is therefore possible to change at least one of the display states of the player-object and the non-player-object according to the music inputted by the player, thereby allowing more fun in the game.

Described next is a more specific exemplary embodiment of a video game system provided with the sound generating device according to the preferred embodiment of the present invention. Note that, although the following embodiment is described as a case where the sound generating device of the present embodiment is applied to the video game system, the sound generating device of the present embodiment can be applied to other information processing devices such as personal computers and electronic musical instruments. Furthermore, although the controller is a video game machine controller in the case described below, the controller may take any structure (e.g., as long as it has a plurality of switches and an analog-type operation input device).

Figure 2:
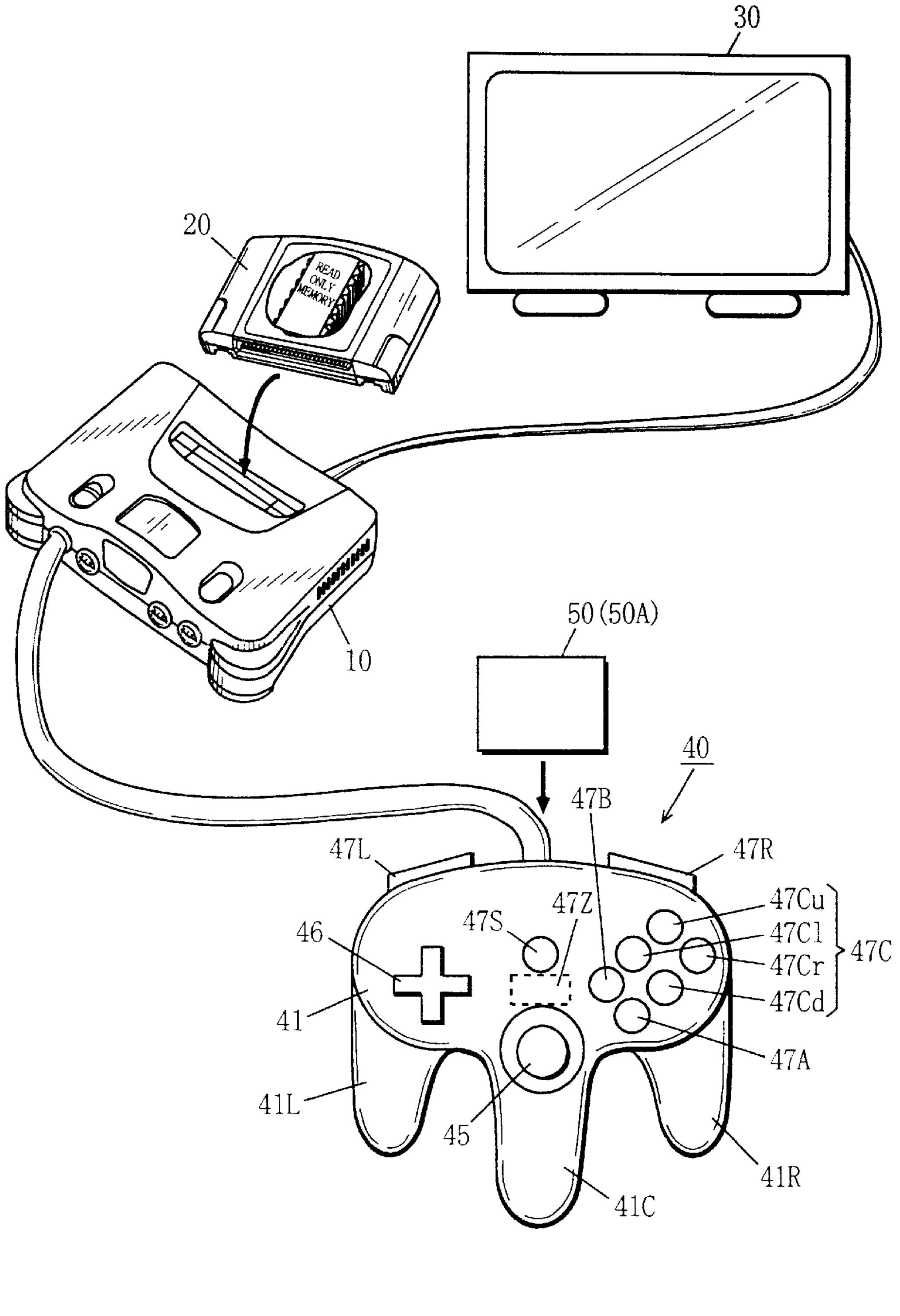
FIG. 2 is an external view more specifically illustrating the configuration of the video game system provided with the sound generating device according to the exemplary embodiment of the present invention.

FIG. 2 is an external view showing a more specific configuration of the video game system provided with the sound generating device according to the embodiment of the present invention. In FIG. 2, the video game system of the present invention is constructed to include a video game machine body 10, a ROM cartridge 20, which is an example of external storage means, a CRT display 30, which is an example of a display device connected to the video game machine body 10, and a controller 40, which is an example of an operation part (or operation input part). A RAM cartridge 50 (or a vibration cartridge 50A) is removably attached to the controller 40, as required.

The controller 40 is structured such that a housing 41 having a shape that can be grasped by either one or both hands is provided with a plurality of switches or buttons. Specifically, the lower portions on the left, center, and right of the housing 41 of the controller 40 are provided with handles 41L, 41C, and 41R, respectively, and the upper surface thereof is an operational area. The operational area is provided at lower center with an analog joystick 45 capable of inputting directions in an analog manner (hereinafter abbreviated as “joystick”). The operational area is further provided with a cross-shaped digital direction switch (hereinafter referred to as “cross switch”) at left, and a plurality of button switches 47A to 47C at right. The joystick 45 is used for instructing or inputting a moving direction and/or a moving speed (or amount of movement) of the player-object according to the amount of tilt and direction of the stick. Further, for sound input or music play through sound input, the joystick 45 is used in order to variously change the frequency of the generated sound by instructing the amount of change in frequency for changing the frequency of the inputted tone, or by specifying a depth value indicating the depth of the sound when the sound is vibrated. The cross switch 46 is used instead of or together with the joystick 45, for digitally instructing the moving direction of the player-object.

The plurality of button switches 47 includes switches 47A and 47B for instructing the motion of the player-object in a normal game mode. The switches 47C are for use in switching the viewpoints of the image from a camera and other purposes. A motion switch 47L is provided on the upper-left side portion of the housing 41, and a motion switch 47R is provided on the upper-right side portion of the housing 41. A switch 47Z is also provided on the backside of the handle 41C. The switches 47C are formed of four button switches 47Cu, 47Cd, 47Cl, and 47Cr arranged in a cross. The switches 47C are used not only for switching the camera viewpoint, but also for controlling a moving speed and the like (for example, acceleration and deceleration) in a shooting game or an action game.

Furthermore, in order to input an arbitrary sound or tone or to play music through sound input by using the video game machine controller 40, the switch 47A is used as a button for selecting a tone (for example, a button which generates the sound of “re”). The switch 47B is used for returning from a music play mode to the normal play mode. The switch 47R is used for raising the selected tone by a semitone. The switch 47Z is used for turning up the volume (by 1.4 times, for example). The switches 47C (including the switches 47Cu, 47Cl, 47Cr, and 47Cd) are, like the switch 47A, used as buttons for selecting tones. In the embodiment described below, the switches 47Cd, Cr, Cl, and Cu are used as buttons for specifying sounds “fa”, “la”, “ti”, and “re” (“re” that is one octave higher than “re” of the switch 47A), respectively.

Note that the functions of these switches 47A to 47Z can be arbitrarily defined by a game program.

Figure 3:
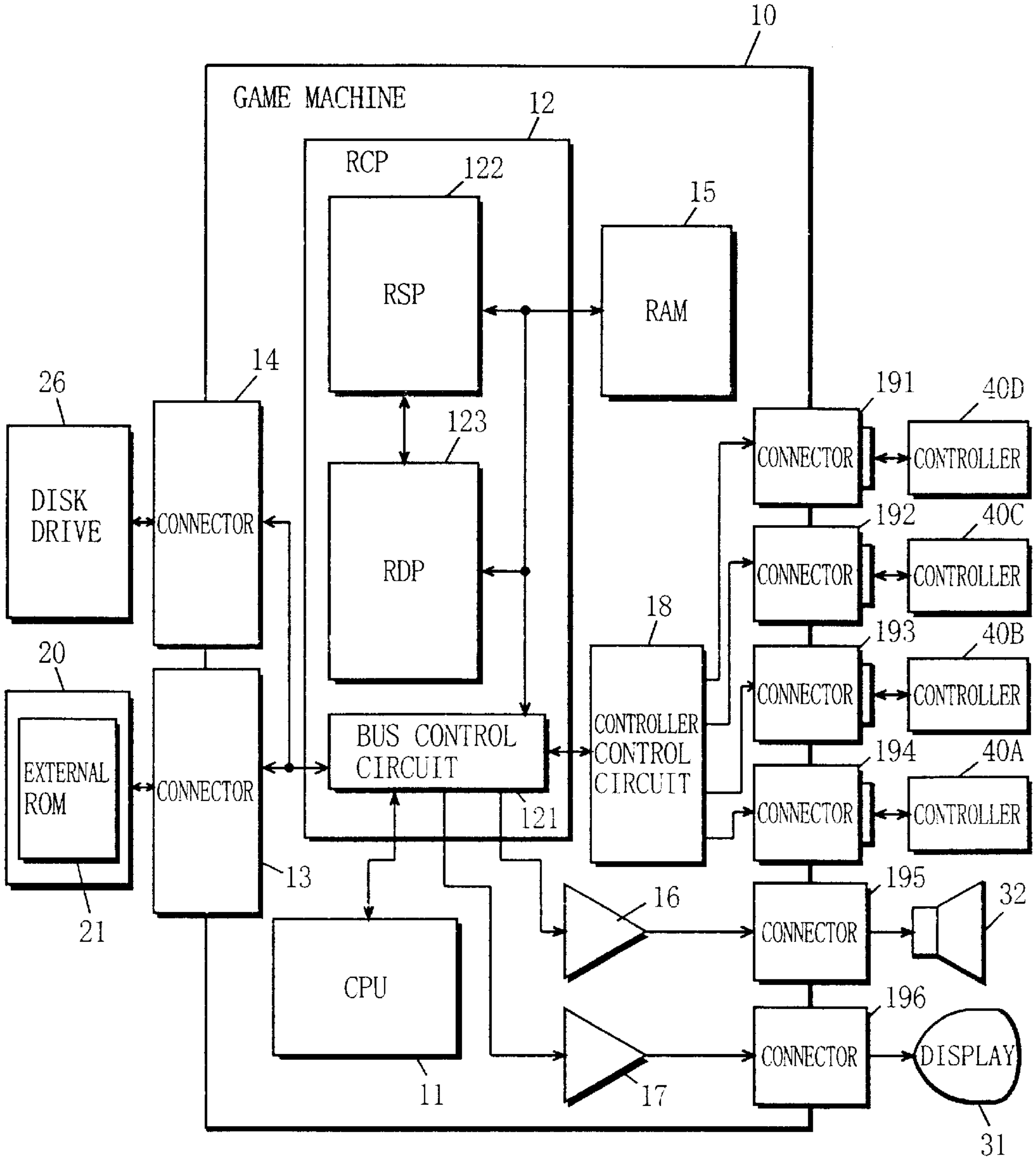
FIG. 3 is a block diagram showing an electrical configuration of the video game system shown in FIG. 2.

FIG. 3 is a block diagram showing an exemplary electrical configuration of the video game system shown in FIG. 2. In FIG. 3, the video game machine body 10 incorporates a central processing unit (hereinafter abbreviated as "CPU") 11 and a reality coprocessor (hereinafter abbreviated as "RCP") 12. The RCP 12 includes a bus control circuit 121 for bus control, an image processing unit (reality signal processor; hereinafter abbreviated as "RSP") 122 for polygon coordinate transformation, shading processing, and the like, and an image processing unit (reality display processor; hereinafter abbreviated as "RDP") 123 rasterizing polygon data onto the image to be displayed and converting the results into those in a data format (dot data) storable in frame memory. A cartridge connector 13 into which the ROM cartridge 20 is removably inserted, a disk drive connector 14 into which a disk drive 26 is removably inserted, and RAM 15 are connected to the RCP 12. Further, an audio signal generator circuit 16 for outputting an audio signal processed by the CPU 11 and an image signal generator circuit 17 for outputting an image signal processed by the CPU 11 are connected to the RCP 12. Further, a controller control circuit 18 for serially transferring operation data of one or more controllers (four controllers 40A to 40D are exemplarily shown in FIG. 3) and/or the data in the extended RAM cartridge 50 is connected to the RCP 12.

The bus control circuit 121 included in the RCP 12 converts a command provided from the CPU 11 through a bus as a parallel signal into a serial signal, and supplies the serial signal to the controller control circuit 18. The bus control circuit 121 also converts a serial signal from the controller control circuit 18 into a parallel signal, and supplies the. parallel signal through the bus to the CPU 11. The data indicating the operating states read from the controllers 40A to 40D is processed by the CPU 11 or temporarily stored in the RAM 15. In other words, the RAM 15 includes a storage area for temporarily storing the data to be processed by the CPU 11, and is used for smoothly reading or writing the data through the bus control circuit 121.

A connector 195 provided on the rear side of the video game machine body 10 is connected to an output part of the audio signal generator circuit 16. A connector 196 provided on the rear side of the video game machine body 10 is connected to an output part of the image signal generator circuit 17. A sound producer 32 such as a television speaker is removably connected to the connector 195. A display 31 such as a television and CRT is removably connected to the connector 196.

Controller connectors (hereinafter abbreviated as "connectors") 191 to 194 provided on the front side of the video game machine body 10 are connected to the controller control circuit 18. The controllers 40A to 40D are removably connected to the connectors 191 to 194 through connecting jacks. As such, the controllers 40A to 40D are connected to the connectors 191 to 194 and, as a result, are electrically connected to the video game machine body 10—thereby enabling transmission and transfer of data between these controllers and the video game machine body 10.

Figure 4:
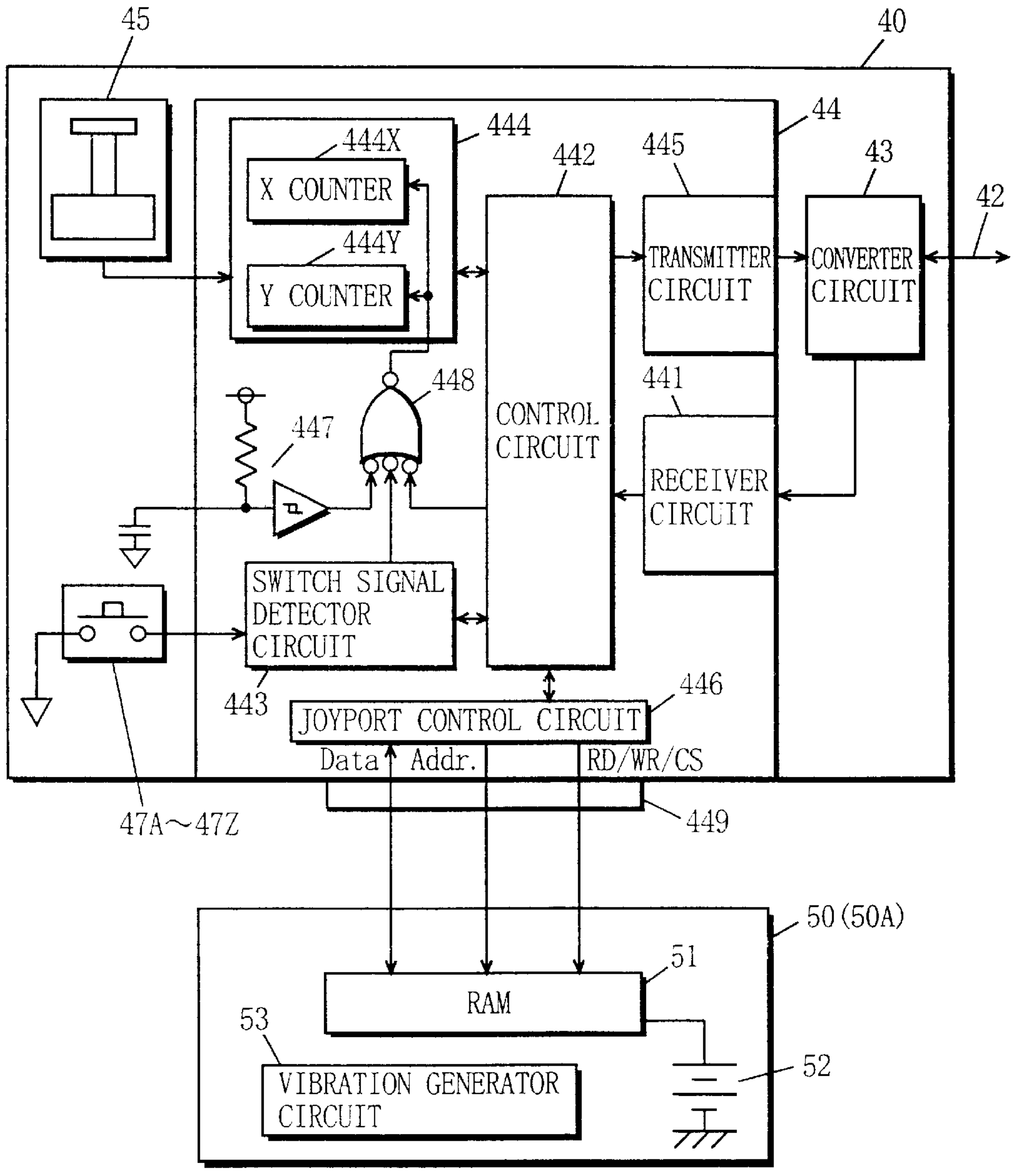
FIG. 4 is a block diagram showing a controller 40 and a RAM cartridge 50 shown in FIG. 2 in detail.

FIG. 4 is a block diagram showing an exemplary detailed structure of the controller 40 and the RAM cartridge 50. In FIG. 4, the housing of the controller 40 accommodates various circuits such as an operation signal processing circuit 44 for detecting the operating states of the joystick 45, the switches 46 and 47, and others and transferring the detection data to the controller control circuit 18. The exemplary operation signal processing circuit 44 includes a receiver circuit 441, a control circuit 442, a switch signal detector circuit 443, a counter circuit 444, a transmitter circuit 445, a joyport control circuit 446, a reset circuit 447, and a NOR gate 448. The receiver circuit 441 converts a serial signal such as a control signal transmitted from the controller control circuit 18 and data to be written in the RAM cartridge 50 into a parallel signal, and supplies the parallel signal to the control circuit 442. When the control signal sent from the controller control circuit 18 is for resetting the X-Y coordinates of the joystick 45, the control circuit 442 produces a reset signal and supplies it to the counter 444 through the NOR gate 448. Thus, the counter values in an X-axis counter 444X and a Y-axis counter 444Y both included in the counter 444 are reset (e.g., forcing them to 0).

The joystick 45 includes X-axis and Y-axis photointerrupters for resolving the tilting direction of the lever into the X-axis direction and the Y-axis direction and generating pulses in proportion to the amount of tilt in each axis direction. These X-axis and Y-axis photointerrupters supply pulse signals to the X-axis counter 444X and the Y-axis counter 444Y, respectively. When the joystick 45 is tilted in the X-axis direction, the X-axis counter 444X counts the number of pulses generated according to the amount of tilt. When the joystick 45 is tilted in the Y-axis direction, the Y-axis counter 444Y counts the number of pulses generated according to the amount of tilt. Therefore, a composite vector of X-axis and Y-axis defined by the counter values of the X-axis and Y-axis counters 444X and 444Y determines the moving direction and coordinate position of the player-object (main character, cursor, or the like). Note that the X-axis and Y-axis counters 444X and 444Y can be also reset by a reset signal supplied from the reset signal generator circuit 447 when powered on or by a reset signal supplied from the switch signal detector circuit 443 when the player presses predetermined two switches simultaneously. At this time, each counter value is cleared to 0.

Responding to an output command of switch states supplied from the control circuit 442 at predetermined intervals (for example, a 1/60 second interval, which is a frame cycle for televisions), the switch signal detector circuit 443 reads a signal which varies according to the depress states of the cross switch 46 and the switches 47A to 47Z, and supplies the signal to the control circuit 442. Responding to a signal from the controller control circuit 18 for instructing read of the operating state data, the control circuit 442 supplies to the transmitter circuit 445 the operating state data of the switches 47A to 47Z and the counter values of the X-axis and Y-axis counters 444X and 444Y in a predetermined data format. The transmitter circuit 445 converts the parallel signal from the control circuit 442 into a serial'signal, and transfers the serial signal to a converter circuit 43 and further to the controller control circuit 18 through a signal line 42. The port control circuit 446 is connected to the control circuit 442 through an address bus and a data bus. When the RAM cartridge 50 is connected to a port connector 449, the port control circuit 446 controls output/input (or transmission/receiving) of data according to instructions from the CPU 11.

The ROM cartridge 20 is constructed as such that its housing accommodates a substrate with external ROM 21 contained thereon. The external ROM 21 stores image data and program data for image processing for game and the like, as well as audio data such as music, sound effects, and messages, as required.

Figure 5:
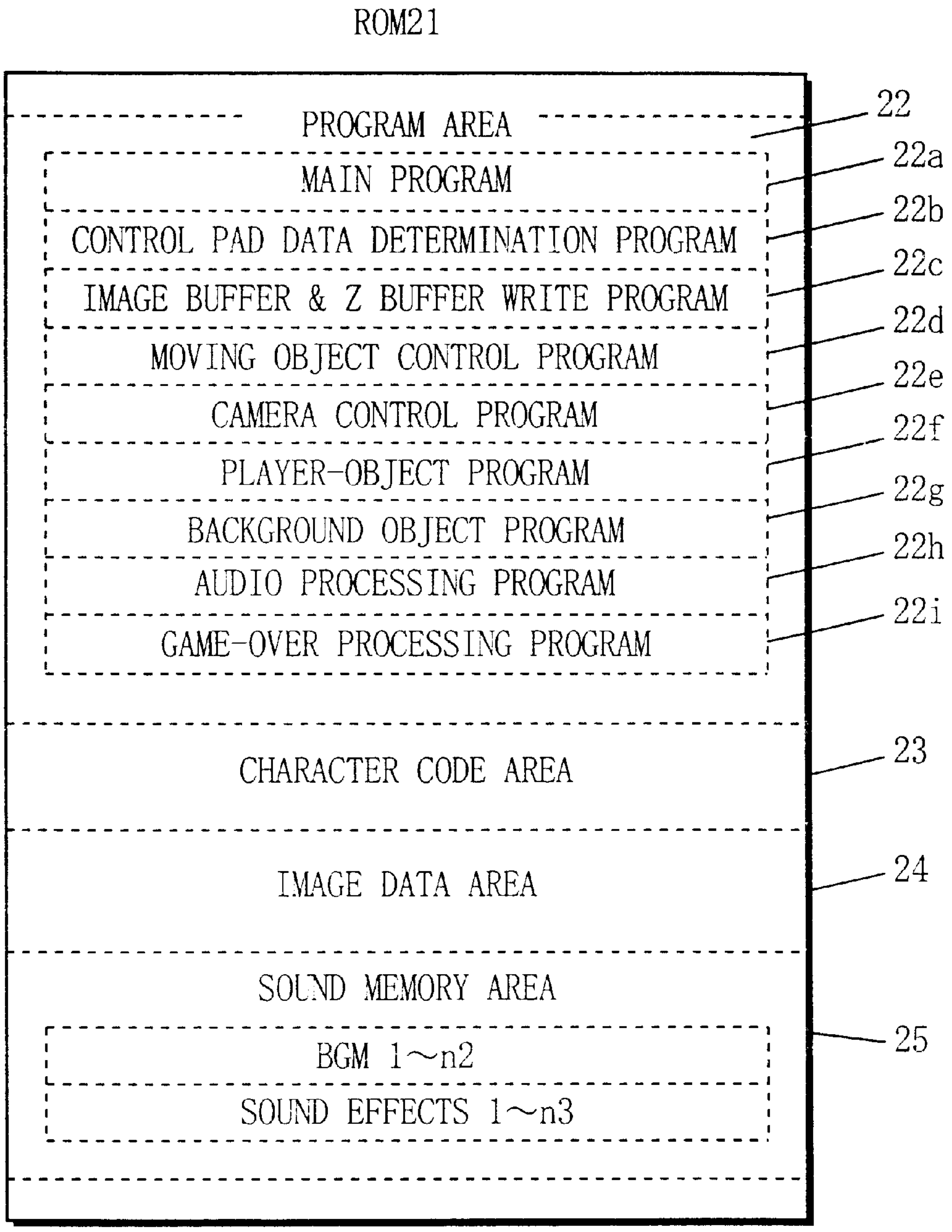
FIG. 5 is a memory map illustrating memory space of external ROM 21 shown in FIG. 3.
Figure 6:
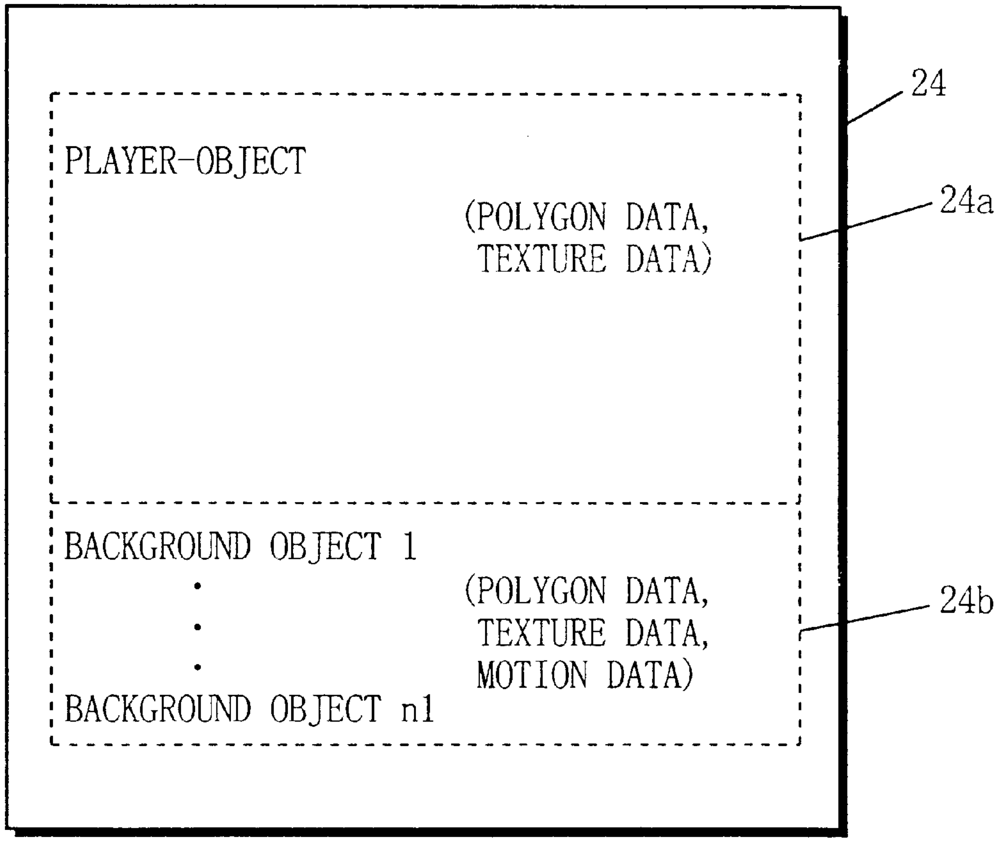
FIG. 6 is a memory map showing part (image display data area 24) of the memory space of the external ROM 21 in detail.

FIG. 5 is an exemplary memory map illustrating memory space in the external ROM 21. FIG. 6 is an exemplary memory map showing part (image data area 24) of the memory space of the external ROM 21 in detail. As shown in FIG. 5, the external ROM 21 includes, as storage areas, a program area 22, a character code area 23, an image data area 24, and sound memory area 25. The external ROM 21 previously stores various programs therein in a fixed manner.

The program area 22 stores programs required for performing image processing on game and others and for realizing functions shown in flow charts (FIGS. 8 to 12, FIGS. 19 to 21, and FIGS. 23 to 25, which will be described later), game data according to the game contents, and others.

Specifically, the program area 22 includes storage areas 22*a* to 22*i* each for fixedly storing an operating program for the CPU 11 in advance. In the main program area 22*a*, a program for a main routine such as game processing is stored. In the control pad data (operating state) determination program area 22*b*, a program for processing data indicative of the operating state of the controller 40 and the like is stored. In the write program area 22*c*, a write program to be executed when the CPU 11 instructs the RCP 12 to write data into frame memory and a Z buffer is stored. For example, in the write program area 22*c*, a program for writing color data into a frame memory area (storage area 152 shown in FIG. 7) of the RAM 15 and a program for writing depth data into the Z buffer area (storage area 153 shown in FIG. 7) are stored. Such color data and depth data are stored as image data based on texture data of a plurality of moving objects or background objects to be displayed on a single background screen. In the moving object control program area 22*d*, a control program for changing the position of the moving object in three-dimensional space by the RCP 12 under instructions from the CPU 11 is stored. In the camera control program area 22*e*, there is stored a camera control program that controls from which position and in which direction moving objects including the player-object and background objects should be photographed. In the player-object program area 22*f*, a program (refer to FIG. 9) for controlling display of the object operated by the player is stored. In the background program area 22*g*, a background generation program (refer to FIG. 10) for generating a three-dimensional background screen (still screen, course screen, or the like) by the RCP 12 under instructions from the CPU 11 is stored. In the audio processing program area 22*h*, a program (refer to FIG. 25) for generating sound effects, music and audio messages is stored. In the game-over processing program area 22*i*, a program for performing processing at the time of game-over (for example, detecting the state of game-over, and storing backup data of the game states that have been present before game-over) is stored.

The character code area 23 is an area in which a plurality of types of character codes are stored. For example, dot data of the plurality of types of characters corresponding to codes are stored therein. The character code data stored in the character code area 23 is used for displaying a description for the player during the progress of the game. For example, the character codes are used for displaying appropriate operation at appropriate timing through messages (or lines) in character, according to environments surrounding the player-object (such as the place, the type of the obstacle, and the type of the enemy-object) and the situation the player-object is experiencing.

The image data area 24 includes storage areas 24*a* and 24*b* as shown in FIG. 6. For each background object and/or moving object, image data such as plural polygon coordinate data and texture data is stored in the image data area 24. Also in the image data area 24, a display control program is stored for fixedly displaying each object at a predetermined position or for displaying each object as it moves. For example, in the storage area 24*a*, a program for displaying the player-object is stored. Further, in the storage area 24*b*, a background object program for displaying a plurality of background (or still) objects 1 to n1 is stored.

In the sound memory area 25, sound data is stored, such as audio messages appropriate to each scene, sound effects, and game music.

As the external storage device that is connected to the video game machine body 10, various storage media may be used such as CD-ROM and a magnetic disk, instead of or in addition to the ROM cartridge 20. For using those media, the disk drive (recording/reproducing device) 26 is provided for reading or writing, as required, various game data (including program data and data for image display) from or into an optical or magnetic disk-like storage medium such as CD-ROM and a magnetic disk. The disk drive 26 reads data from the magnetic or optical disk in which program data similar to that in the external ROM 21 is optically or magnetically stored. The disk drive 26 transfers the read data to the RAM 15.

Figure 7:
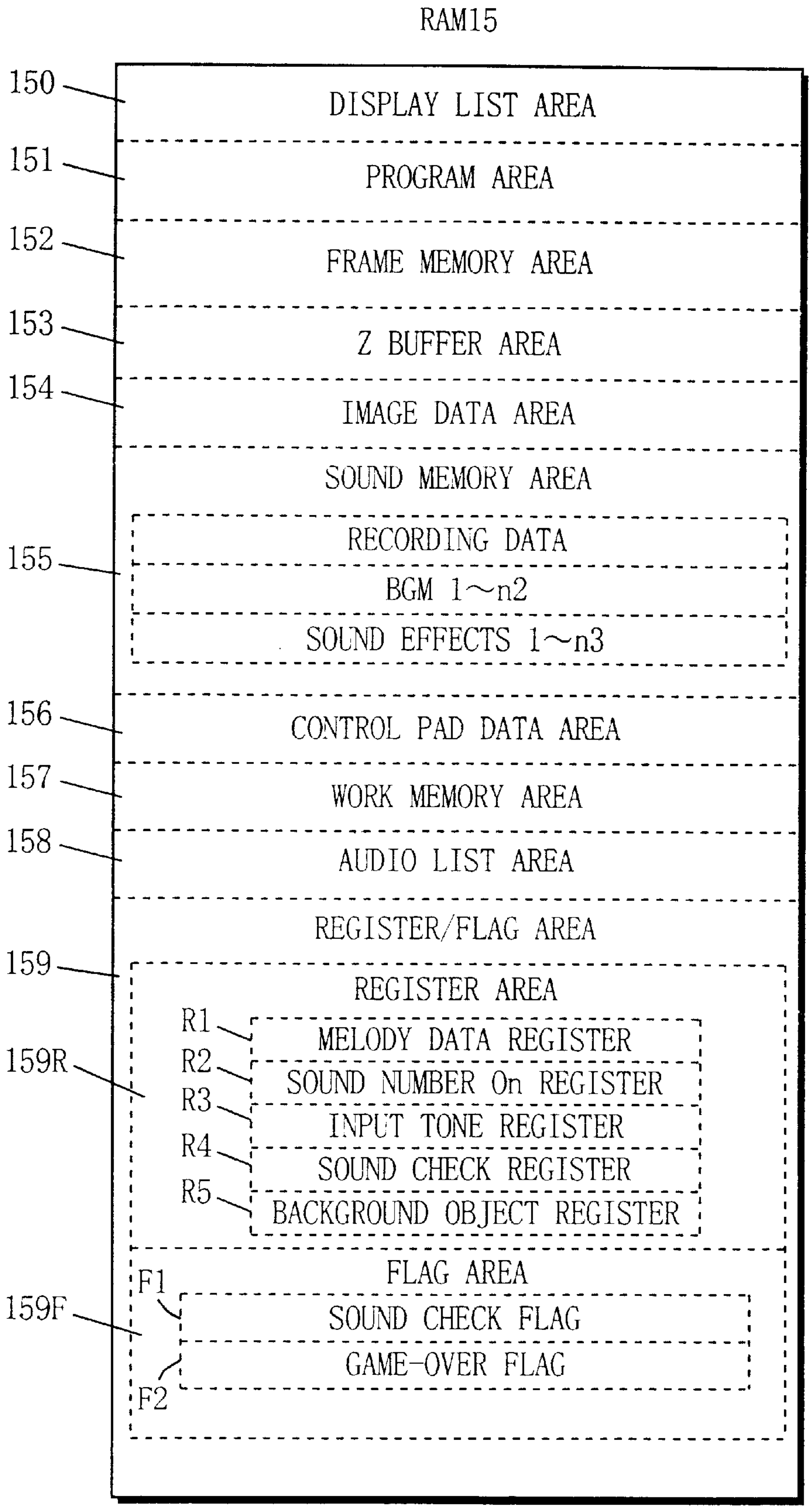
FIG. 7 is a memory map illustrating memory space of RAM 15.

FIG. 7 is a memory map illustrating memory space in the RAM 15. By way of example, the RAM 15 includes, as storage areas:

- a display list area 150,
- a program area 151,
- a frame memory (or image buffer memory) area 152 for temporarily storing image data for one frame,
- the Z buffer area 153 for storing depth data for each dot of the image data stored in the frame memory area,
- an image data area 154,
- a sound memory area 155,
- a storage area 156 for storing data of the operating state of a control pad,
- a work (working) memory area 157,
- an audio list area 158, and
- a register/flag area 159.

Each of the storage areas 151 to 159 is memory space accessible by the CPU 11 through the bus control circuit 121 or directly accessible by the RCP 12. Arbitrary capacity (or memory space) is allocated to these areas according to the game in use. Part of the entire game program data for all stages (or called scenes or fields) stored in the storage areas 22, 24 and 25 of the external ROM 21 is transferred and temporarily stored in the program area 151, the image data area 154, and the sound memory area 155, respectively (such part is, for example, a game program required for a certain stage or field in action games or role playing games (a course, in race games)). By storing part of various program data required for a certain scene in each of the storage areas 151, 154, and 155, the efficiency in processing can be increased, compared with reading such data directly from the external ROM 21 every time required by the CPU 11. As a result, the image processing speed in the CPU 11 can be increased.

Specifically, the frame memory area 152 has a storage capacity equivalent to (the number of picture elements (pixels or dots) of the display 30)×(the number of bits of color data per picture element), in which the color data corresponding to each picture element of the display 30 is stored per dot. In the frame memory area 152, the color data of the subject viewed from a viewpoint is temporarily stored per dot in the image processing mode, based on three-dimensional coordinate data. The three-dimensional coordinate data is to display one or more still object(s) or moving object(s) stored in the image data area 154 to be displayed on a single background screen as a collection of plural polygons. Also in the frame memory area 152, the color data for displaying various objects stored in the image data area 154 is temporarily stored per dot in the display mode. The various objects include moving objects such as a player-object, friend-object, enemy-object, and boss-object, and background (or still) objects. Note that the moving objects such as an enemy-object and boss-object and the background (or still) objects cannot be moved or changed through operation of the controller 40 by the player, and therefore may be generically called "non-player-objects".

The Z buffer area 153 has a storage capacity equivalent to (the number of picture elements (pixels or dots) of the display 30)×(the number of bits of depth data per picture element), in which the depth corresponding to each picture element of the display 30 is stored per dot. In the Z buffer area 153, the depth data of the subject viewed from a viewpoint is temporarily stored per dot in the image processing mode, based on three-dimensional coordinate data. The three-dimensional coordinate data is to display one or more still object or moving objects stored in the image data area 154 to be displayed on a single background screen as a collection of plural polygons. Also in the Z buffer area 153, the depth data of the moving and/or still objects is temporarily stored per dot in the display mode.

In the image data area 154, coordinate data of the plurality of collections of polygons and texture data are stored for each still and/or moving object for game display stored in the external ROM 21. Prior to image processing operation, data for at least one stage or field is transferred to the image data area 154 from the external ROM 21.

To the sound memory area 155, part of audio data (data of lines, music, and sound effects) stored in the external ROM 21 is transferred. In the sound memory area 155, the data transferred from the external ROM 21 is temporarily stored as data of sound to be generated from the sound producing device 32. Also in the sound memory area 155, sound or tone data inputted by the player is stored. In the audio list area 158, audio data for creating sound to be produced by the speaker is stored.

In the control pad data (operating state data) storage area 156, operating state data indicative of the operating state read from the controller 40 is temporarily stored. In the work memory area 157, data such as parameters is stored during program execution by the CPU 11.

The register/flag area 159 includes a register area 159R having a plurality of registers and a flag area 159F having a plurality of flags. The register area 159R includes, for example, a melody data register R1 for storing tone data of a melody, a sound number register R2 for storing the order of sounds, an input tone register R3 for storing the tone data inputted by the player, a sound check register R4 for storing tone-check results, and a the-number-of-background-objects register R5 for storing the number of background objects. The flag area 159F is an area in which flags indicative of the states during game progress are stored. For example, a sound check flag F1 and game-over flag F2 for identifying the presence or absence of detection of the conditions for game-over are stored in the flag areas 159F.

Figure 8:
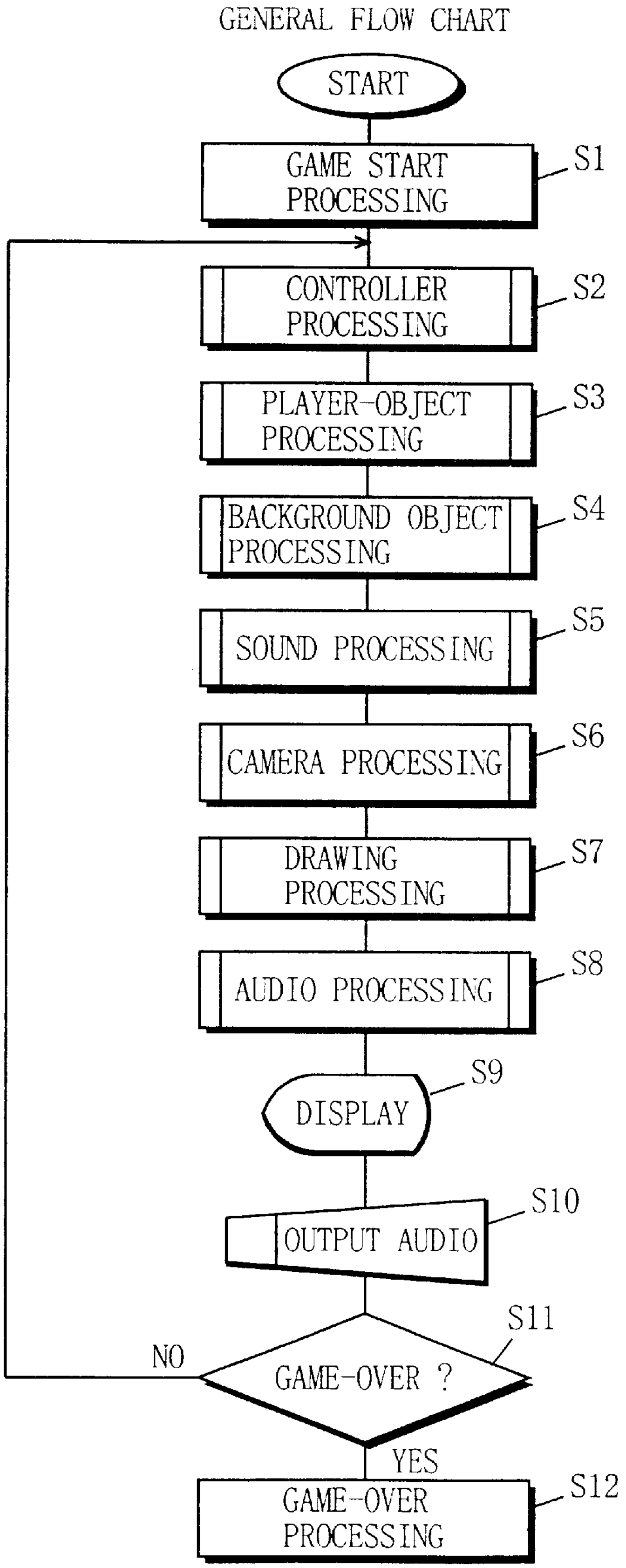
FIG. 8 is a flow chart of a main routine showing a general operation of a game machine body 10 shown in FIG. 2.

FIG. 8 is a flow chart of an exemplary main routine showing the general operation of the game machine body 10 shown in FIG. 2. The operation of the present embodiment is described next according to the main routine flow chart of FIG. 8 with reference to detailed (or subroutine) flow charts of respective operation shown in FIGS. 9 to 12, FIGS. 19 to 21, FIGS. 23 to 25.

When powered on, the video game machine body 10 is set to a predetermined initial state for starting. In response, the CPU 11 transfers a start-up program of the game program stored in the program area of the external ROM 21 to the program area 151 of the RAM 15, initializes each parameter, and then executes the main routine flow chart shown in FIG. 8.

The main routine processing shown in FIG. 8 is performed by the CPU 11 for each frame (e.g., every 1/60 second). That is, the CPU 11 performs operations from steps S1 to S11 and then repeatedly performs operation from steps S2 to S11 until one stage (field, or course) is cleared. However, steps S7 and 8 are directly performed by the RCP 12. Further, the CPU 11 performs game-over processing of step S12 when the game is over without a success in stage clearing. On the other hand, when the stage is successfully cleared, the CPU 11 returns from step S12 to step S1.

Specifically, in step S1, initialization for game start (that is, game start processing) is performed. At this time, when the game can start from any point in the plural stages or courses, for example, a stage or course selection screen is displayed. However, Stage 1 of the game is played immediately after startup, and therefore game start processing for that stage is performed. That is, the register area 159R and the flag area 159F are cleared, and various data required for playing Stage 1 (or, selected stage or course) of the game is read from the external ROM 21 and transferred to the storage areas 151 to 155 of the RAM 15.

Next, in step S2, controller processing is performed. In this processing, any one of the controllers that is operated among the joystick 45, the cross switch 46, and the switches 47A to 47Z is detected. Further in this processing, detection data (controller data) of an operating state is read and written.

Next, in step S3, processing for displaying the player-object is performed. This processing is basically to change the direction and shape of the player-object based on the operating state of the joystick 45 operated by the player and the presence or absence of attacks from an enemy, which will be described later with reference to FIG. 9. In this display control of the player-object, for example, the coordinate position and shape of the polygon data of the player-object after change is calculated. This calculation is based on the program transferred from the storage area **22*f*, the polygon data of the player-object transferred from the storage area 24*a*, and the operating state of the joystick 45, for example. As a result, a plurality of polygons are obtained to compose a plurality of triangles. The color data is written into each address in the storage area 154** corresponding to each surface of these triangles as if a pattern or a piece of color specified by the texture data is pasted.

Next, in step S4, processing for displaying the background object is performed. In this processing, the display position and shape of the background object is calculated based on the program partially transferred from the storage area **22*g* and the polygon data of the background object transferred from the storage area 24, which will be described later with reference to FIG. 10**.

Figure 11:
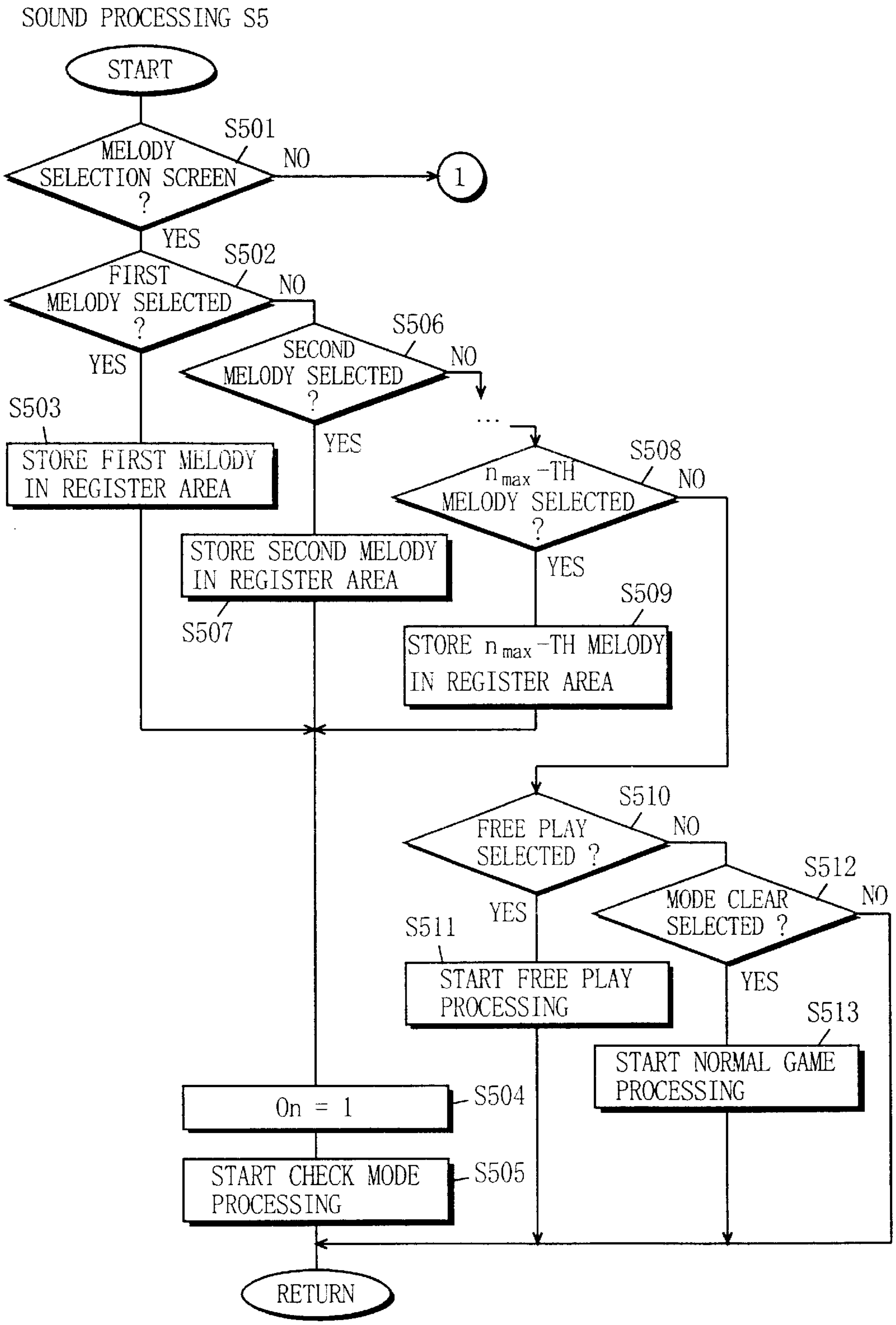
FIG. 11 is a subroutine flow chart showing part of detailed operation of sound processing (step 5) shown in FIG. 8.
Figure 12:
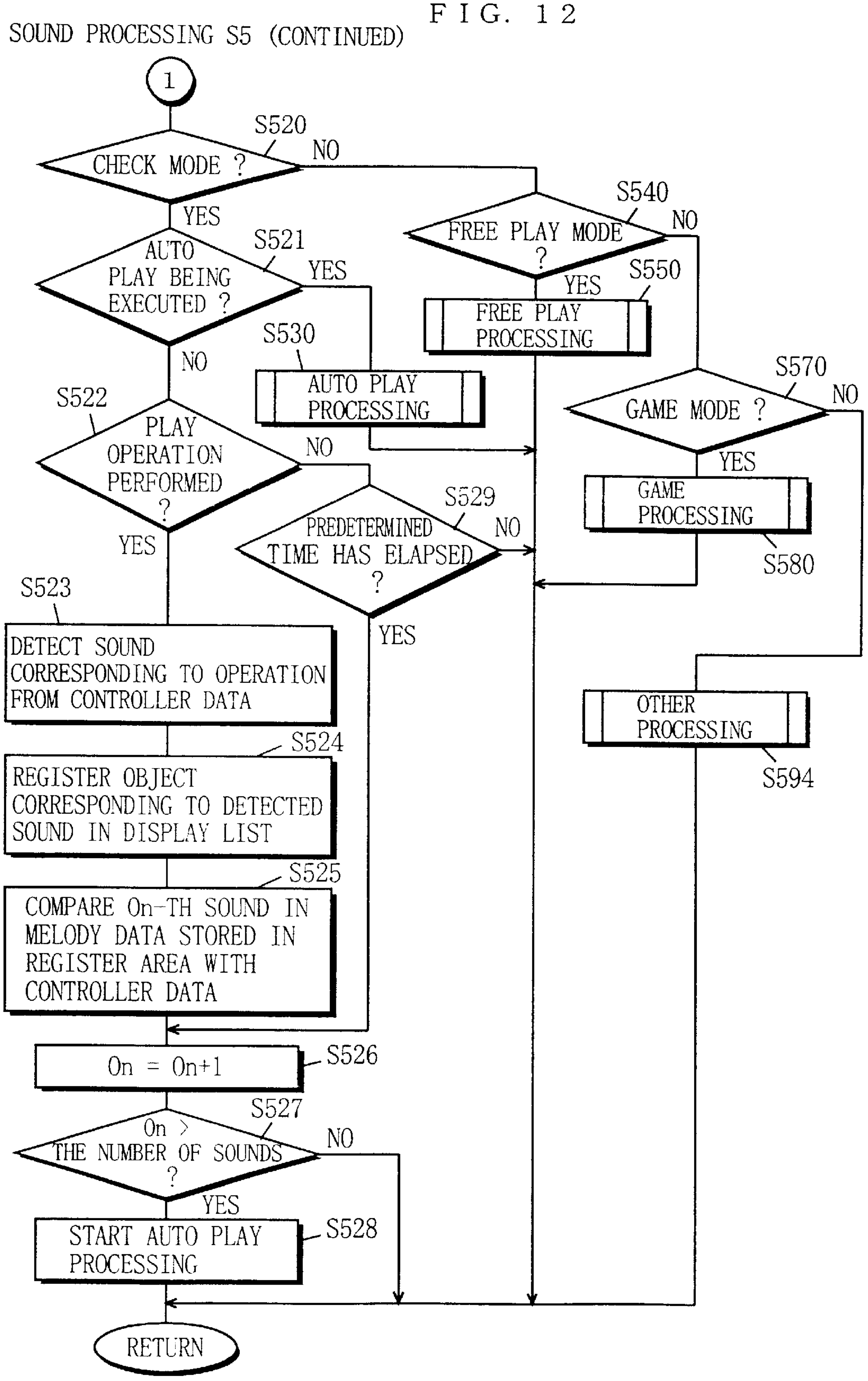
FIG. 12 is a subroutine flow chart showing the remaining part of the detailed operation of the sound processing (step 5) shown in FIG. 8.

Next, in step S5, sound processing is performed. This processing is to produce music being played by the player, and its detail is shown in FIGS. 11 and 12, which will be described later. Auto play processing in FIG. 12 is shown in detail in FIG. 19. Free play processing in FIG. 12 is shown in detail in FIG. 20. Recording processing in FIG. 12 is shown in detail in FIG. 23.

Next, in step S6, camera processing is performed. In this camera processing, for example, the coordinates of each object are calculated when each object is viewed at a specified angle so that the line of sight or the field of view through the finder of the camera has the specified angle.

Next, in step S7, the RSP 122 performs drawing processing. That is, the RCP 12 transforms image data of the moving and still objects for display (coordinate transformation processing and frame memory drawing processing), based on the texture data of enemies, the player, background objects (moving and still objects) stored in the image data area 154 of the RAM 15. Specifically, the color data is written into each address in the storage area 154 corresponding to each of polygon triangles for each of the moving and still objects so that a color and the like specified by the texture data determined for each object is pasted. The drawing processing will be described in detail with reference to FIG. 24.

Next, in step S8, the audio processing is performed based on the audio data such as messages, music, and sound effects. The audio data processing will be described in detail with reference to FIG. 25.

Next, in step S9, the RCP 12 reads the image data stored in the frame memory area 152 based on the results of the drawing processing in step S7, and thereby the player-object, moving object, still object, and enemy object and the like are displayed on the display screen 31.

Next, in step S10, the RCP 12 reads the audio data obtained through the audio processing of step S8, and thereby audio such as music, sound effects, or speech is outputted.

Next, in step S11, whether the stage or field is cleared or not is determined (clear detection). If not cleared, whether the game is over or not is determined in step S11. If not over, the procedure returns to step S2, and repeats the operations in steps S2 thorough S11 until the conditions for game-over are detected. Then, when the gameover conditions are detected, such as, when the number of times allowed for the player to fail the stage or field reaches a predetermined value and when a predetermined number of lives of the player-object are consumed, predetermined game-over processing (processing to select either of continuing the game or not, processing to select either of storing backup data or not, and the like) is performed in step S12.

On the other hand, when the conditions for stage clearing (such as beating the boss) is detected in step S11, predetermined clear processing is performed in step S12, and then the procedure returns to step S1.

The operation of each subroutine is now described below in detail.

Figure 9:
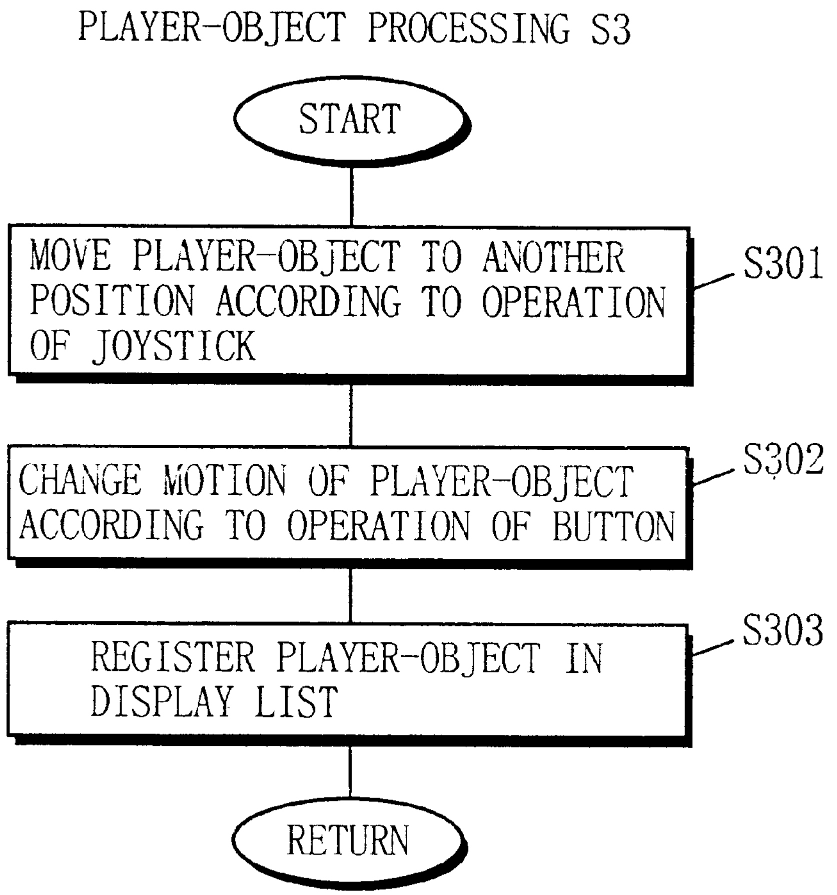
FIG. 9 is a subroutine flow chart showing a detailed operation of player-object processing (step S3) shown in FIG. 8.

First, with reference to FIG. 9, the processing of displaying the player-object (step S3 in FIG. 8) is described in detail. In step S301, joystick data stored in the control pad data area 156 is read and corrected. For example, data as to the center portion of an operable range of the joystick 45 is deleted. That is, the joystick data is processed to become "0" when the stick is positioned at its home position, that is, in the vicinity of the center (a 10-count radius, for example). With such operation, the joystick data in the vicinity of the center can be correctly controlled to "0" even when the joystick 45 has a manufacturing error or when the player's fingers slightly tremble. Further, data within a predetermined range in the vicinity of the periphery of the operable range of the joystick 45 is also corrected. This correction is made in order not to output data of unnecessary part during game progress. Next, joystick data Xj and Yj for use during the game are obtained. In other words, the data calculated in step S301 is represented by the count values of the X-axis counter 444X and the Y-axis counter 444Y, and therefore these count values are converted into values that can be easily processed in the game. Specifically, Xj becomes "0" when the stick is not tilted, "+64" when tilted to maximum in −X direction (leftward), and "−64" when tilted to maximum in +X direction. (rightward). Yj becomes "0" when the stick is not tilted, "−64" when tilted to maximum in +Y direction (forward), and "+64" when tilted to maximum in −Y direction (downward). According to such joystick data, the coordinate position for moving the player-object is obtained.

Next, in step S302, in response to push-button switch operation, the processing is performed for controlling motions of the player-object (processing for making a motion such as jumping, cutting an enemy with a sword, and launching a missile).

Next, in step S303, based on the data as to the player-object obtained in steps S301 and S302, the player-object data to be displayed on a single screen is registered in the display list area 150. This registration processing is performed as pre-processing for drawing processing (will be described later with reference to FIG. 24) when the player-object is displayed.

Figure 10:
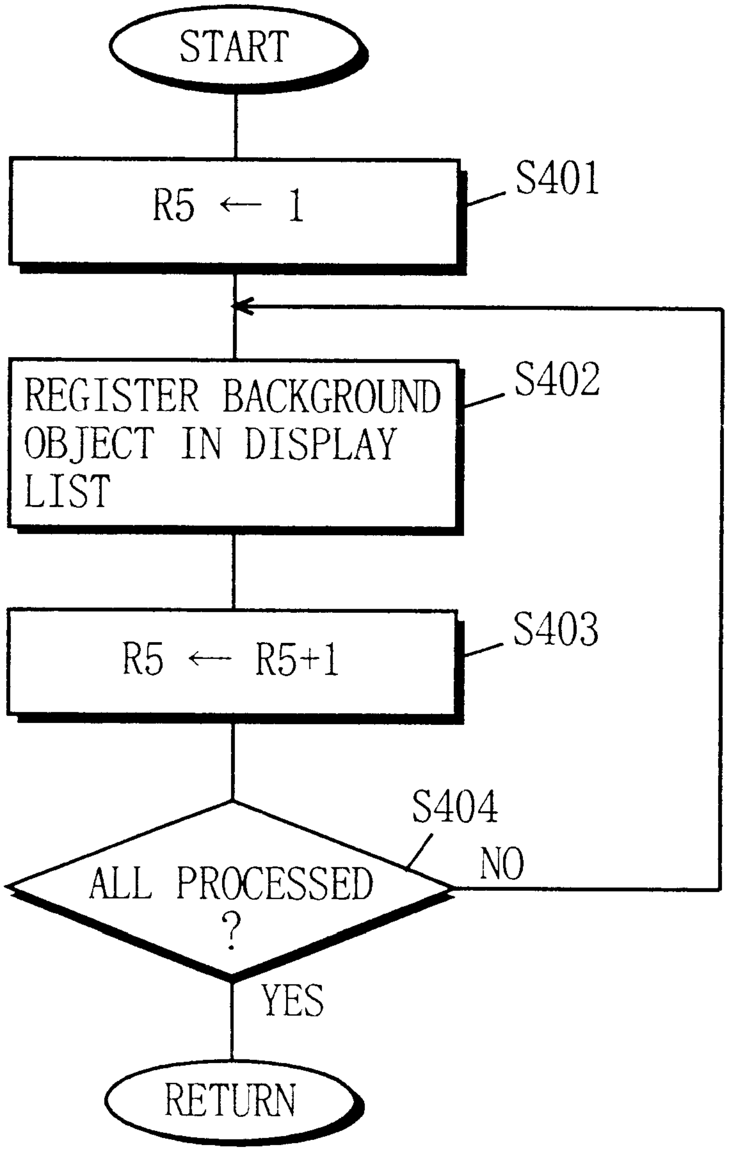
FIG. 10 is a subroutine flow chart showing a detailed operation of background object processing (step S4) shown in FIG. 8.

Next, with reference to FIG. 10, display processing of the background object (processing in step S4 of FIG. 8) is described in detail. In step S401, 1 is set in the number-of-background-object register R5. Next, in step S402, the background objects specified by the number-of-background-object register R5 is registered in the display list. Next, in step S403, the number-of-background-object register R5 is incremented by 1. Next, in step S404, it is determined whether processing for displaying all background objects set by the program has ended or not (in other words, whether the value in the number-of-background-object register R5 coincides with the number of background objects to be displayed on a single screen or not). If not yet ended, the procedure returns to step S402, and repeats the processing in steps S402 through S404. If ended, the procedure returns to step S5 of the main routine in FIG. 8.

Here, prior to detailed description of sound processing (step S5 of FIG. 8), the game assumed in the present embodiment is briefly described. In the game, the player-object moves to various stages and fields in three-dimensional space to clear an event or to clear each stage by beating an enemy. During the game, the player operates the controller to input sounds or tones, and achieves the goal determined by the program while playing music. Further, in the game, one or more melodies are displayed on a notice board or the like during game play. When the player operates the controller for playing one of the melodies, it is determined that the melody is a predetermined one (that is, a factor of changing the object). Accordingly, the display state of at least one of the player-object and the non-player-object is changed.

In one specific example of object change when a predetermined melody or music is played (when sound is inputted), the player-object is moved (or warped) to a place in specific three-dimensional space. In another example, the player-object is allowed to enter a specific area (room) (or the player-object is made to unlock the door). In other words, as for the former example, the background surrounding the player-object is changed to the background of the destination. As for the latter, the background surrounding the player-object is changed to the scene in that specific room. As such, the display state of the non-player-object is changed. In still another example of object change when a predetermined melody or music is played (when sound is inputted), the player-object is allowed to unlock a jewelry box. In still another example, the player-object is provided with a special item such as a protector or weapon. In these cases, the display state of non-player-objects is changed so that the jewelry box is opened, and the display state is changed so that the player-object wears the protector or carries the weapon.

Figure 13:
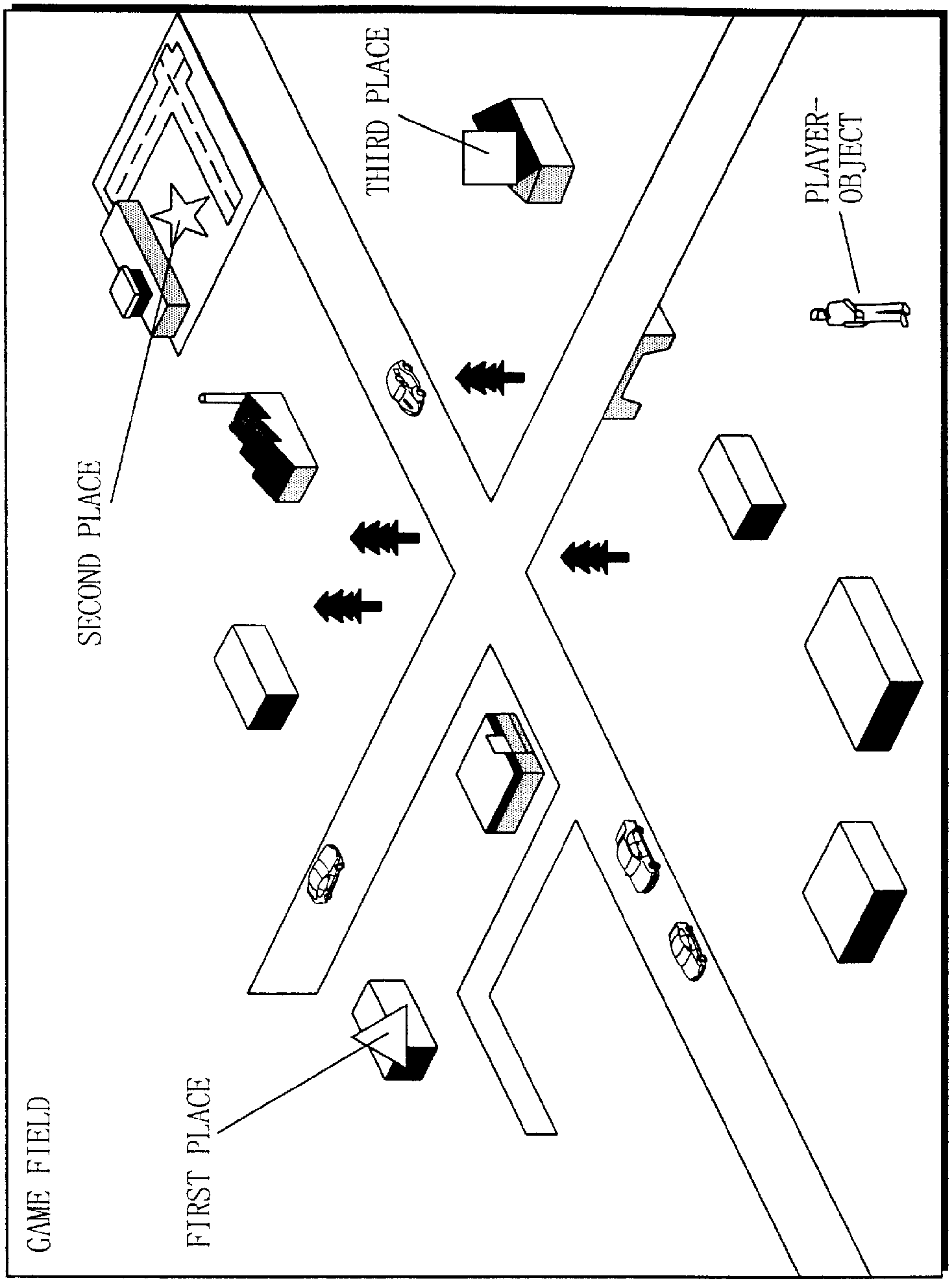
FIG. 13 is a diagram illustrating the whole three-dimensional space in one stage or field.

FIG. 13 shows the whole three-dimensional space in a single stage or field. However, FIG. 13 represents the virtual world as a bird's eye view, and what is actually displayed on the screen of the CRT 30 as a game screen is only part of the vicinity of the player-object. In this state, the player-object is at a lower-right position (place). When the player operates the controller 40 and plays a predetermined melody, the player-object can move (or warp) to any one of first to third places corresponding to that melody. At this time, the camera photographs the player-object after move and the background or still images in the vicinity of the player-object. As a result, the player-object and the background in the vicinity thereof are displayed on the screen of the CRT 30.

Next, with reference to the subroutine flow charts of FIGS. 11 and 12, sound processing to be executed in step S5 of FIG. 8 is described in detail. In step S501, it is determined whether the melody selection screen is displayed or not. This melody selection screen is exemplarily shown in FIG. 14. When the player operates (or clicks an icon marked by an instrument) a specific button switch (for example, start switch 47S) to select a melody play mode (for example, a mode of playing the ocarina), the melody selection mode is displayed as a window. At this time, a list 305 of currently available melodies is displayed on the window. Also, an alternative 302 of a free play mode (playing other melody not included in the melody list), an alternative 303 of closing the window and the like are displayed on the window. Preferably, a musical score (not necessarily a musical staff) 304 is displayed on part of the window, and symbols of the switches corresponding to sounds or notes are displayed. The number of melodies included in the melody list 301 may be increased according to the progress of the game or event participation during the game. The player operates the controller 40 to move upward or downward a cursor 305 displayed on left on the window, thereby selecting an arbitrary melody, and also selecting a play mode or window closing mode. In response, the CPU 11 executes the program corresponding to the selection.

Figure 15:
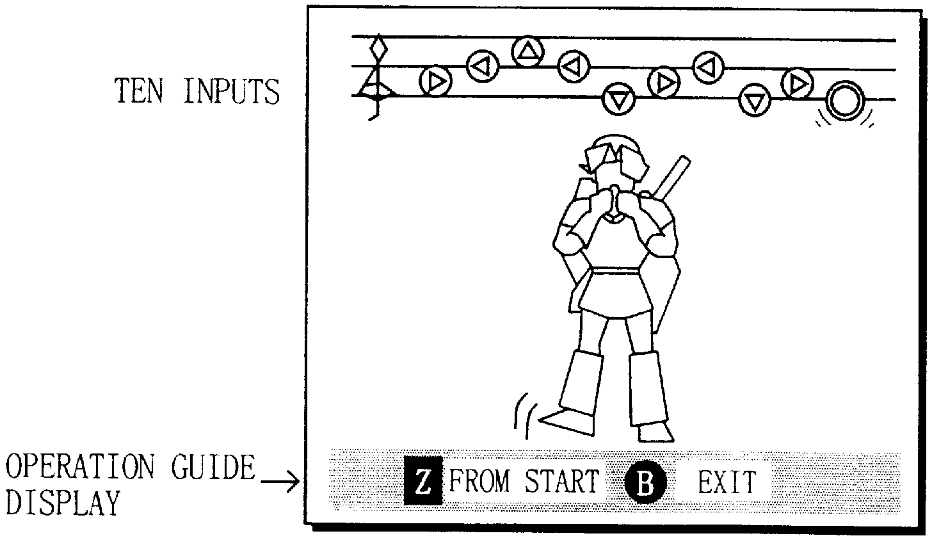
FIG. 15 is a diagram exemplarily illustrating a display of a sound input screen.
Figure 16:
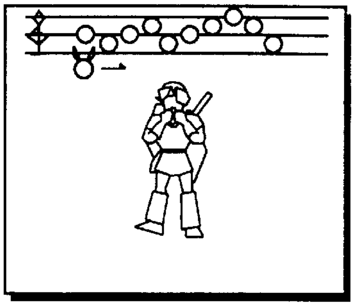
FIG. 16 is a diagram exemplarily illustrating a display of an auto play screen.

As described above, if it is determined in step S501 that the melody selection screen is displayed, it is determined in step S502 whether the player has selected the first melody (for example, melody of wind) or not. If it is determined that the first melody has been selected, data of the first melody is read in step S502 from its storage location of the external ROM 21 or the program area 151 of the RAM 15, and then written into the melody data register R1. Then, in step S504, the value stored in the sound number register R2 is set to "1". Next, in step S505, check mode processing starts. Specifically, processing for switching the screen from the melody selection screen to a check mode screen (refer to FIGS. 15 and 16) is performed. Then, the procedure returns to step S6 of the main routine shown in FIG. 8.

On the other hand, if it is determined in step S502 that the player has not selected the first melody, it is determined in step S506 whether the second melody (for example, melody of fire) has been selected by the player or not. If it is determined that the second melody has been selected, data of the second melody is read in step S507 from its storage location of the external ROM 21 or the program area 151 of the RAM 15, and written into the melody data register R1. The procedure then advances to step S504.

If the selected melody is not the first or second melody, it is determined the n-th (n is an integer not less than 3 and not more than $n_{max}$, and $n_{max}$ is a maximum number defined by the program) melody has been selected or not. If it is determined that the n-th melody has been selected, data of the n-th melody stored in the external ROM 21 or the program area 151 of the RAM 15 is read and written into the melody data register R1. Therefore, if it is determined in step S508 that the $n_{max}$-th melody has been selected by the player, the $n_{,ax}$-th melody data is written in step S509 in the melody data register R1. The procedure then advances to step S504.

On the other hand, if it is determined in step S508 that any of the first to $n_{max}$-th melody has not been selected, it is determined in step S510 whether the free play mode is selected or not. If the free play mode has been selected, the processing for the free play mode starts in step S511. The melody selection screen is switched to the free play mode screen, and the procedure then returns to step S6 of the main routine shown in FIG. 8.

On the other hand, if it is determined in step S510 that the free play mode is not selected, it is determined in step S512 whether window closing (or mode clear) is selected or not. If window closing is selected, the window is closed in step S513, and then the normal game processing is performed. The procedure then returns to step S6 of the main routine shown in FIG. 8.

On the other hand, when it is determined in step S501 that the melody selection screen is not displayed, it is determined in step S520 of FIG. 12 whether the check mode is being executed. If it is determined that the check mode is being executed, it is determined in step S521 whether auto play is being executed or not. If it is determined that auto play is not being executed, it is determined in step S522 whether the controller 40 is operated for play or not, that is, whether any push-button switch (or joystick) assigned for sound input is pressed or not. If the controller 40 is operated for play, the sound corresponding to the operated push-button is determined in step S523 based on the data inputted by the controller 40. Specifically, the specified sound or tone is detected based on the push-button switch and/or the data of the tilt amount of the joystick 45 stored in the control pad data area 156 of the RAM 15.

Figure 17:
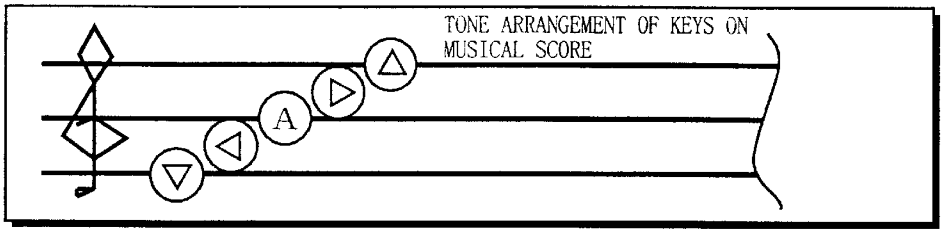
FIG. 17 is a diagram exemplarily illustrating a display of a musical staff and notes in the sound input screen.
Figure 18:
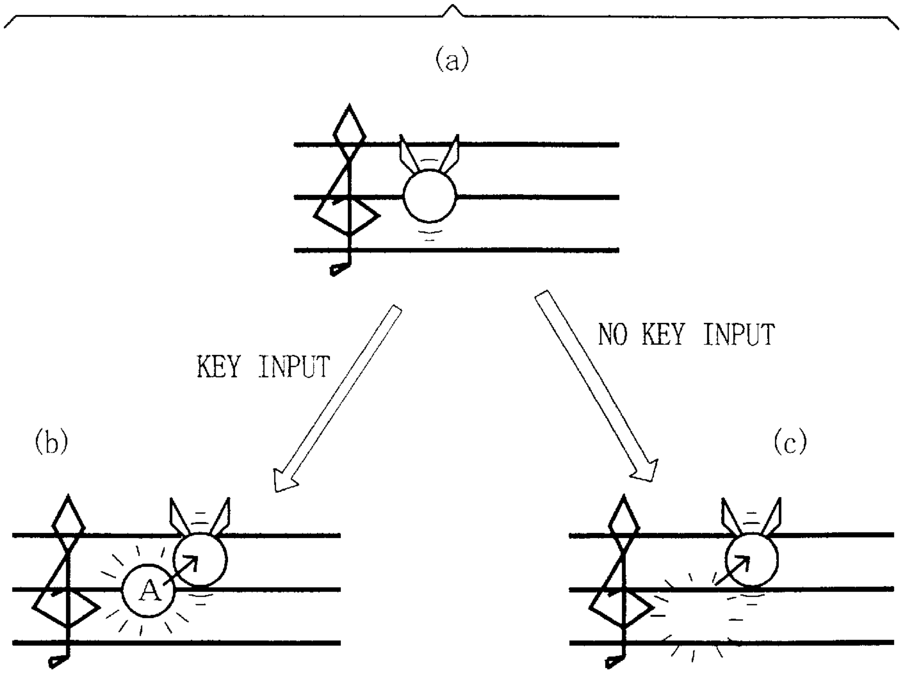
FIGS. 18*a*–18*c* are diagrams illustrating how the notes on the musical staff shown in FIG. 17 change according to key input operation.

In the following S524, in order to display a musical note patterned on a fairy as shown in FIG. 18 on the musical score, a note symbol (object) is registered in the display list. Specifically, in order to display the note object at the position of the tone corresponding to the sound detected in step S523 on the score, the note object is registered in the display list. For example, when the sound input mode is selected by the operation of the controller 40, objects for displaying images shown in FIG. 15 (for example, a plurality of objects for displaying the score on top of the screen, operation guide on the bottom of the screen, the player-object playing the ocarina according to sound input operation by the player in the middle of the screen) or objects shown in FIG. 16 (for example, a plurality of objects for displaying images indicative of auto play without operation guide, which are different from the images in FIG. 15) are registered in the display list. At this time, a score such as shown in FIG. 17 is displayed on a note displaying part located on top of the screen. At the position corresponding to the note to be inputted, a fairy symbol as shown in FIG. 18 (*a*) is displayed for prompting the player to key input. If the predetermined tone is inputted through key input operation, the screen indicates that correct key input is performed, as shown in FIG. 18(*b*). When key input is not performed within a predetermined time, the screen indicates as such shown in FIG. 18(*c*). Therefore, object data to achieve such display is registered in the display list. The drawing processing is performed in step S7 based on such registration in the display list when the procedure returns to the main routine after the processing in step S528, which will be described later. Consequently, in step S9, the image shown in the drawing is displayed on the CRT 30. Further, the data of the detected sound is registered in the audio list.

Next, in step S525, the tone specified by the operation of the controller 40 is compared with a tone of an On-th sound in the melody data stored in the melody data register R1. The comparison result is stored in the sound check register R4. For example, when the specified tone coincides with the stored tone, "1" is registered in a bit of the sound check register R4 according to the order of sounds. Otherwise, "0" is registered therein. The comparison result may be stored as such that "1" is written in the sound check flag F1 when all specified tones coincide with the stored tones, while "0" is written therein if even a single sound is not correct.

Next, in step S526, the storage value of the sound number register R2 is incremented by 1 to be rewritten as the incremented value. In other words, a calculation On=On+1 is performed, and the latest calculation result is stored as a new sound number On. In the following step S527, it is determined whether the storage value On in the sound number register R2 is larger than a predetermined number of sounds ("10", for example). If it is determined that the storage value is larger, the auto play processing is performed in step S528. The procedure then returns to step S6 of the main routine in FIG. 8.

On the other hand, if it is determined in the above step S522 that the controller 40 is not operated for play, it is determined in step S529 whether a predetermined time has elapsed or not. If the predetermined time has elapsed, the procedure advances to step S526. Otherwise, the procedure returns to the main routine in FIG. 8. The reason for determining whether the predetermined time has elapsed or not is for the procedure to advance to input processing for switches except the sound switches. If the player did not press any push-button switch within the predetermined time (five seconds, for example), it is assumed that sound is not inputted.

On the other hand, when it is determined in above step S521 that auto play is being executed, the auto play processing (refer to FIG. 19) is performed in step S530 based on the check result. The auto play processing is next described in detail with reference to FIG. 19.

It is determined in step S531 whether auto play ends or not. If not end, the auto play processing is performed in step S532. Specifically, the musical score is first cleared. Then, based on the tone data temporarily stored in the input tone register R4, the note symbols (objects) are registered in the display list in order to be displayed at the positions corresponding to first to last inputted sounds. Also, the audio data corresponding to these tones is registered in the audio list.

As a result, as shown in FIG. 17, symbols (a down-pointing triangle, a left-pointing triangle, A, a right-pointing triangle, and an up-pointing triangle) indicative of the switches (47Cd, 47Cl, 47A, 47*r*, and 47*u*) corresponding to the sounds to be inputted are displayed on the score. In this state, when a correct switch is operated, the symbol (A, for example) corresponding to that switch is displayed (refer to FIG. 18(*b*)), and its sound is produced. When an incorrect switch is operated, the next sound is processed. If no play operation is present in the above step S522 and if it is determined in step S529 that the predetermined time has elapsed, the processing in steps S524 and S525 is not performed. Therefore, nothing is displayed (refer to FIG. 18(*c*)) and no sound is produced.

On the other hand, if it is determined in step S531 that auto play has ended, it is determined in step S533 whether the tones inputted by the player are all correct or not. This coincidence determination is made by comparing the data stored in the input tone register R3 with the data stored in the melody data register R1. This determination may also be made by determining whether every bit of data stored in the sound check register indicates "1" or not, or the sound check flag F1 indicates "1" or not. Then, when it is determined that the tones are correct, coincidence processing is performed in step S534. As the coincidence processing, predetermined object data may be registered in the display list for displaying that the correct tones have been inputted, or predetermined audio data may be registered in the audio list for playing music such as a fanfare. In the following step S535, it is determined whether the coincidence processing has ended or not. If it is determined that the processing has ended, the game processing starts in step S536 in response to the input of N-th melody. For example, the coordinate position of the player-object in three-dimensional space is calculated after the player-object moves to the place (in the example of FIG. 13, any one of the first to third places) corresponding to the melody selected in the melody selection screen of FIG. 14. Accordingly, the place after move is displayed.

Therefore, the player-object is warped to the place that is different from the place where the player-object was before melody input, and displayed in front of the background objects. if it is determined in step S535 that the coincidence processing has not ended, the procedure returns to step S6 of the main routine in FIG. B.

On the other hand, in step S533, if it is determined in step S533 that the condition "all the tones inputted by the player are correct" is not satisfied, the procedure advances to step S537. In step S537, "1" is set in the sound number register R2 (On=1), prompting the player to operate sound input again. Then, the procedure returns to step S6 of the main routine.

Figure 20:
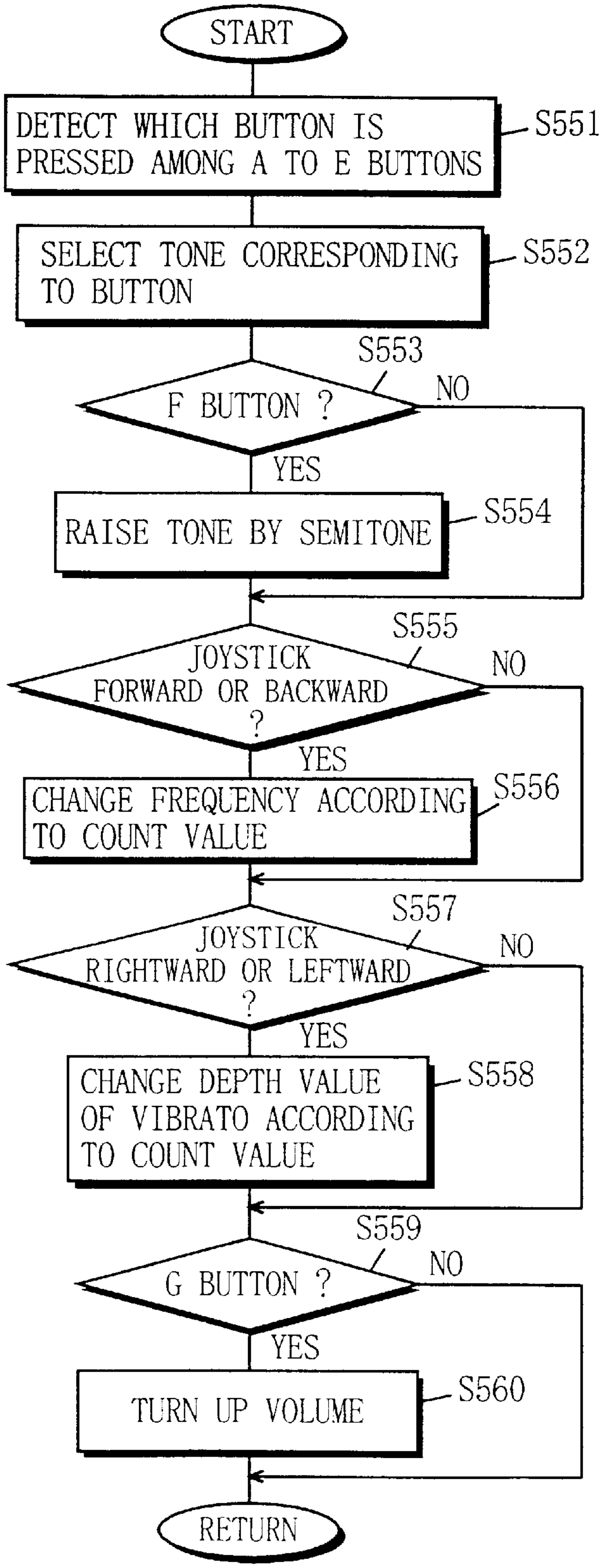
FIG. 20 is a subroutine flow chart showing a detailed operation of free play processing (step S550) shown in FIG. 12.

If it is determined in the above step S520 that the check mode is not being executed, it is determined in step S540 whether the free play mode is being executed or not. If being executed, the free play processing is performed. The free play processing is shown in FIG. 20 in detail.

That is, in step S551, based on the data stored in the control pad data area 156 of the,RAM 15, the push-button switch currently being pressed is detected. Next, in step S552, the tone corresponding to the push-button switch is detected, and the corresponding tone data is generated. Next, it is determined in step S553 whether the detected switch is an F button (switch 47R) or not. If the F button is being pressed, the processing for raising the tone in pitch by a semitone is performed. Otherwise, the procedure skips step S554 to advance to step S555. This sharpening processing is the processing for changing the tone data so that the tone corresponding to the operated switch is raised in pitch by a semitone. For example, if the player has selected the tone of "la", the tone data for generating the sound having the frequency of 440 Hz is generated. If the switch 47R is pressed, the tone data is changed into the tone data for generating the sound of 440×2^(1/12) Hz, which is a semitone higher than the original tone. Note that the symbol "^" represents raising the value before the symbol to (the following-value inside the parentheses)-th power.

In the following step S555, it is determined whether the joystick 45 is operated forward or backward (for example, whether the Y-axis counter 444Y counts the tilt of the joystick 45 or not). If it is determined that the joystick 45 is operated forward or backward, the tone data is changed to change the tone according to the tilt angle of the joystick 45. By way of example, when the joystick 45 is at a neutral position (the home position at the center), the tone is based on the push-button switch. When the joystick 45 is tilted forward to maximum, the tone is raised in pitch by a whole tone (or one tone). When the joystick 45 is tilted backward to maximum, the tone is lowered in pitch by a whole tone. When the joystick 45 is tilted forward or backward but not to maximum, the tone is varied to be raised or lowered within a range of one tone according to its tilt angle. More specifically, the tone may be raised or lowered by a cent (a unit of tone; 2^(1/200)), which is obtained by dividing a whole tone by 200. However, since the Y-axis counter 444Y detects the tilt angle of the joystick 45 with the count value ranging from 0 to 64, the tone cannot be divided by 200. Therefore, when the joystick 45 is tilted forward, the frequency of the tone is multiplied by (1 cent)^(200/64×Y) to raise the tone every time the absolute count value Y varies. On the contrary, when the joystick 45 is tilted backward, the frequency of the tone is divided by (1 cent) A (200/64×Y) every time the absolute count value X varies. Now, assuming that the tone "la" (440 Hz) is selected, the tone data of the tone "la" is changed into tone data of 440×((2^(1/200))^(200/64×Y)) Hz.

Figure 25:
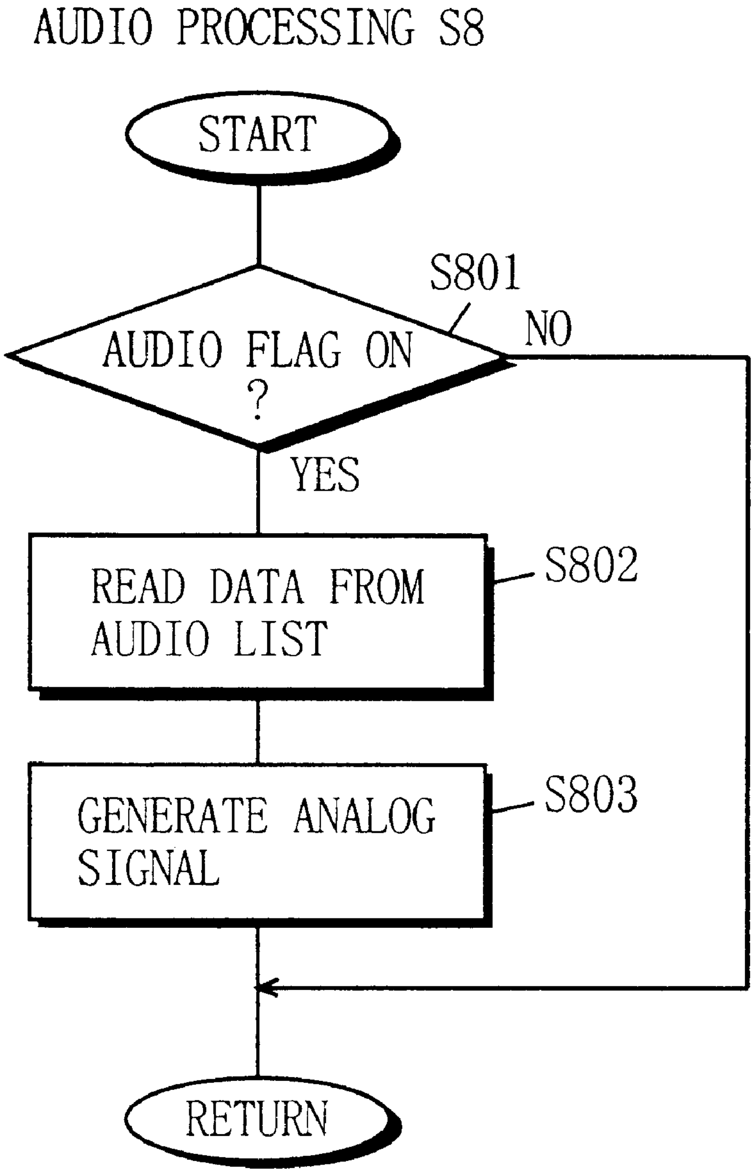
FIG. 25 is a subroutine flow chart showing a detailed operation of audio processing (step S8) shown in FIG. 8.

In other words, by raising or lowering the tone specified by the push-button switch within a range of a whole tone according to the amount of tilt specified by the joystick 45, frequency data of the changed tone is generated, and then written and stored in the audio list 158 (steps S554, S556, S558, and S560) Music data inputted by repeating the above steps is read at predetermined cycle in the audio processing of FIG. 25, which will be described later, and produced as music.

In stead of changing the tone data within the range of a whole tone, the tone data may be raised or lowered by a semitone when the joystick 45 is at a position within a predetermined range between the neutral position and the maximum forward or backward tilt. Further, the push-button switch may specify two consecutive tones as a unit. In this case, the joystick 45 can specify a tone within the range of two tones (for example, a semitone to a whole tone and a half, within a range from a position a little away from the neutral position to the maximum tilt angle).

After step S556 or if it is determined in step S555 that the joystick 45 is not operated forward or backward, the procedure advances to step S557. It is determined in step S557 whether the joystick 45 is operated rightward or leftward (that is, whether the X-axis counter 444X counts the tilt amount of the joystick 45). If it is determined that the joystick 45 is operated rightward or leftward, the processing for changing a depth value of vibrato of the tone data according to the tilt angle toward right or left of the joystick 45 is performed in step S558. For example, when the joystick 45 is at the neutral position, the sound is not vibrated. When the joystick 45 is tilted rightward or leftward to maximum, the sound is vibrated most deeply. When the joystick 45 is tilted between the neutral position and the maximum tilt position, the depth value is increased or decreased according to the tilt angle. In the present embodiment, to vibrate in four stages, the count value (X: absolute value) ranging 0 to 64 is changed, and the depth value is changed accordingly. More specifically, when the joystick 45 is tilted leftward (or rightward), the depth value is set to 1.001807^(X/4). Each numerical value and set value is defined through experiments to make comfortable sound. Now assuming that the user selects the tone "la" (440 Hz), the tone data of the tone "la" is changed into tone data of the tone subjected to vibrato with its frequency being raised or lowered (vibrated) within a range between 440×(depth value=1.001807^(X/4)) and 440/(depth value =1.001807^(X/4)).

After step S558 or if it is determined in step S557 that the joystick 45 is not operated rightward or leftward, the procedure advances to step S559. It is determined in step S559 whether the push-button switch being pressed that was detected in step S551 is a G button (switch 47Z) or not. If the push-button switch being pressed is the G button, volume data for increasing the volume by 1.4 times is generated in step S560 so that the volume is increased with its tone left unchanged. After step S560 or if it is determined in step S559 that the G button is not pressed, the procedure returns to step S6 of the main routine in FIG. 8.

The tone data and volume data generated as described above are registered in the audio list as sound data. Such sound data is outputted in the audio processing step S8 and the audio output step S10, which will be described later.

On the other hand, if it is determined in step S540 that the free play mode is not being executed, it is determined in step S570 whether the game mode is being executed or not. When the game mode is being executed, the game processing is performed in step S580.

Figure 14:
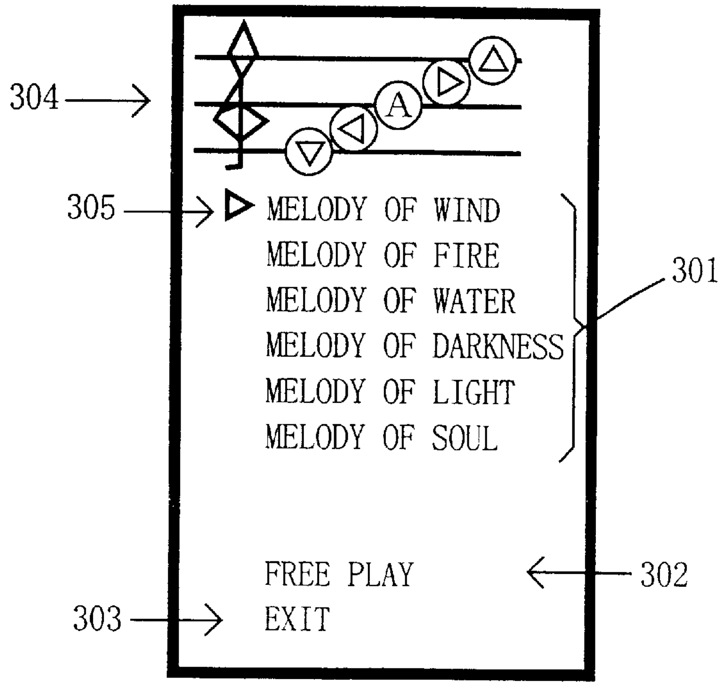
FIG. 14 is a diagram exemplarily illustrating a display of a melody selection screen.
Figure 21:
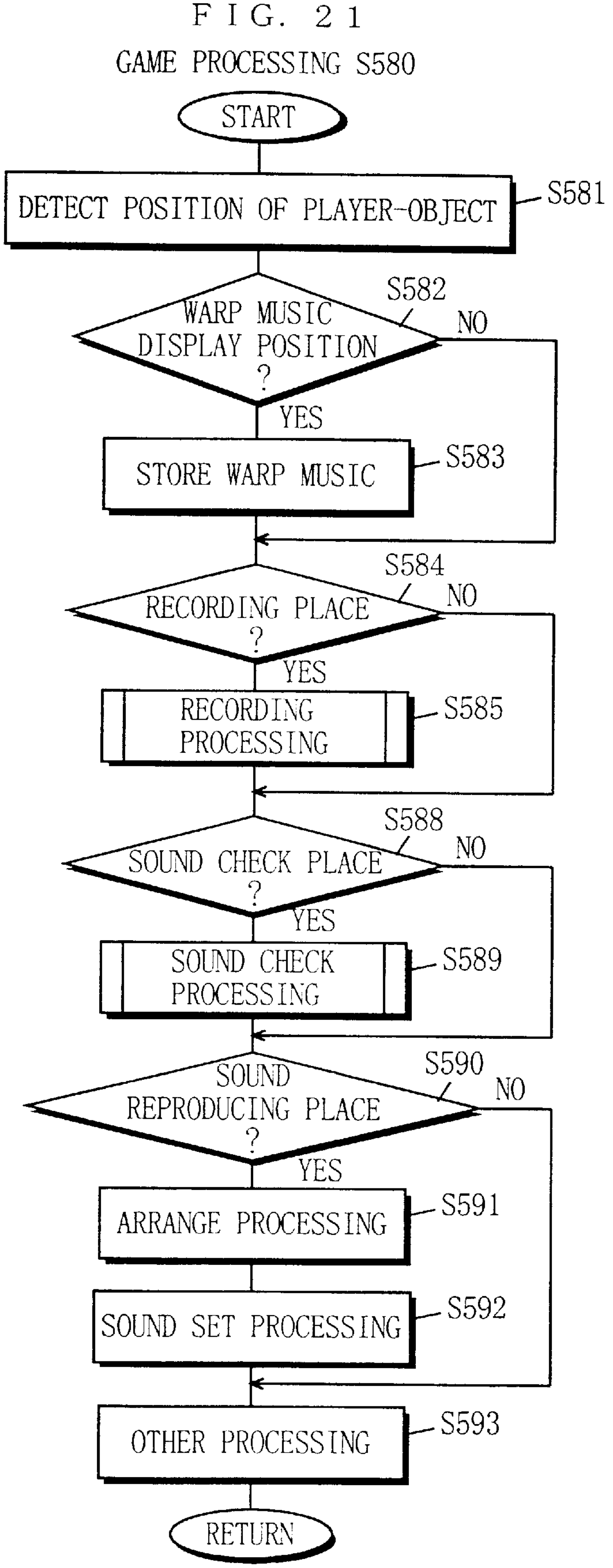
FIG. 21 is a subroutine flow chart showing a detailed operation of game play processing (step S580) shown in FIG. 12.
Figure 22:
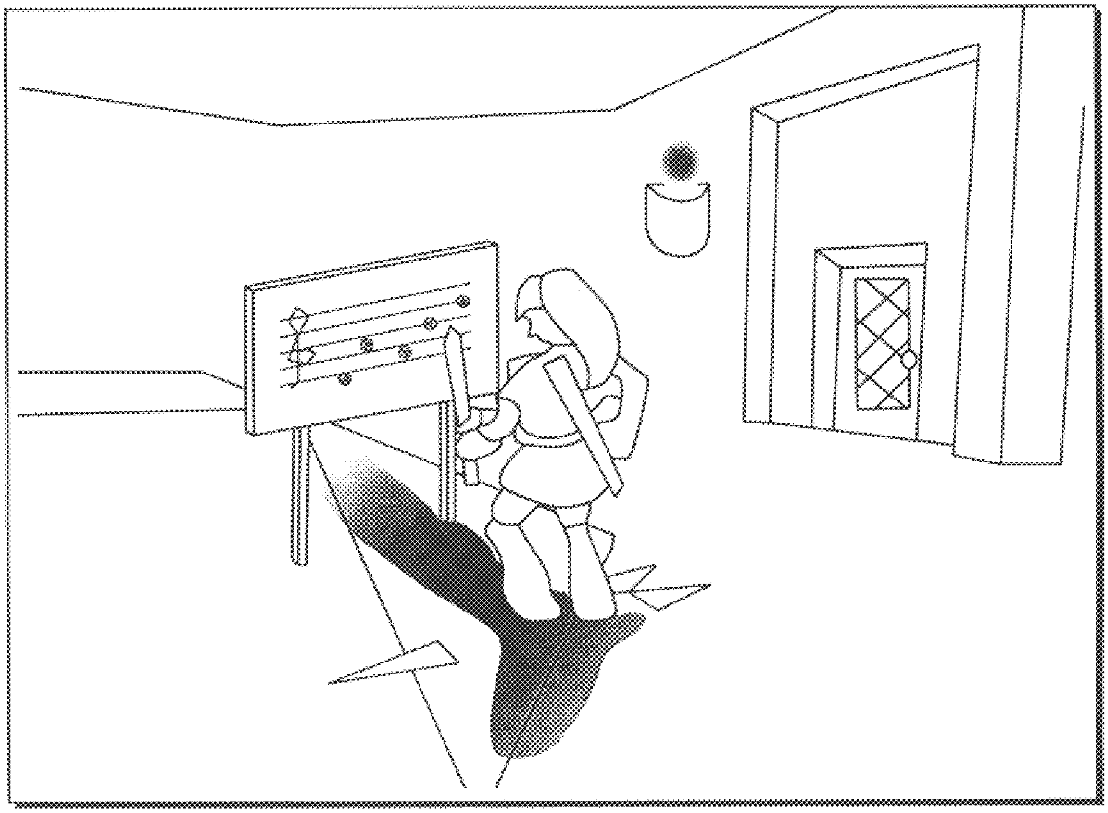
FIG. 22 is a diagram exemplarily showing a display of a notice board.

The details in the game processing are illustrated in a subroutine flow chart shown in FIG. 21. That is, in step S581, the position of the player-object is detected. Next, it is determined in step 582 whether the player-object is at a position where the score of a warp melody is to be displayed. If it is determined that the player-object is at such position, a notice board object is registered in the display list, for example, in step S583, in order to display the scores of predetermined melodies on a notice board. Also the tone data corresponding to the melodies displayed on the notice board is written in the work memory area 157 of the RAM 15. As a result, an image as shown in FIG. 22 is displayed. Then, the melodies are registered as available melodies, and displayed as shown in FIG. 14. After step S583 or if it is determined in step S582 that the player-object is not at the display position, the procedure advances to step S584.

In step S584, it is determined whether the player-object is at a predetermined recording place (a position where the sound played by the player is to be recorded) or not. If it is determined that the player-object is at the predetermined recording place, processing of recording the sound played by the player is executed in step S585. In the game assumed in the present embodiment, the player-object is instructed to play music when the player-object meets a specific person, object, or the like, for example. In the recording processing of step S585, if the player performs operation for free play (refer to the description of FIG. 20) according to the instruction, the data of the melody to be played is stored in the RAM 15.

Figure 23:
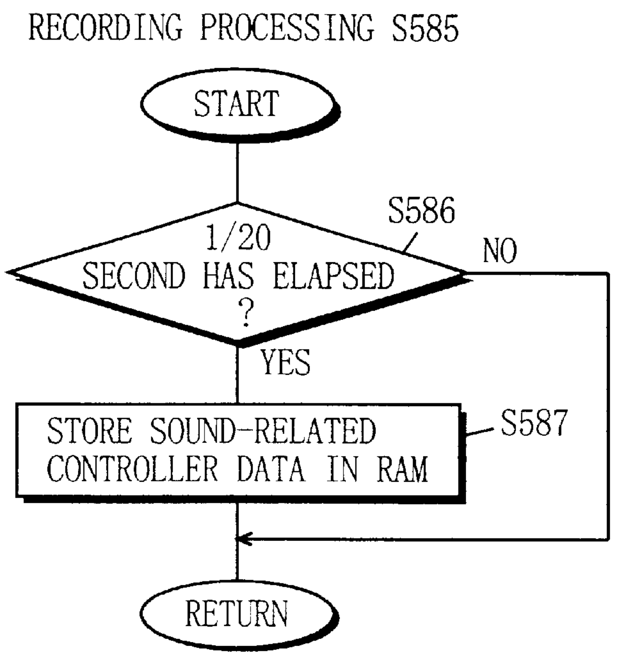
FIG. 23 is a subroutine flow chart showing a detailed operation of recording processing (step S585) shown in FIG. 21.

The details of the recording processing are shown in FIG. 23. That is, in step S586, it is determined whether a 1/20 second has elapsed since the previous recording. If elapsed, data stored in the control pad data area 156 (all data or data related to sound) is stored in the sound memory area 155 as recording data in step S587. Then, or after it is determined in step S586 that a 1/20 second has not elapsed, the procedure advances to step 588 (refer to FIG. 21).

It is determined in step S588 whether the player-object is at a predetermined sound check place or not. When the player-object is at such place, check processing of the sound played by the player is executed in step S589. This check processing is similar to the above described check processing in steps S520 to S530 except that the melody to be checked with the played melody is "the melody recorded by the player" instead of "the melody selected by the player". Therefore, description of this check processing is omitted herein. After step S589 or if it is determined in step S588 that the player-object is not at the sound check place, the procedure advances to step S590.

It is determined in step S590 whether the player-object is at a place (or position) where sound is to be reproduced. When the player-object is at such place, the processing of arranging the sound data based on the recorded controller data is executed in step S591. This arrangement processing includes processing of adding musical characteristics of other musical instruments except the instrument played by player, or processing of changing rhythms according to the mood of the scene. Next, in step S592, sound setting processing is executed. This processing is to mix and register the music data created through the arrange processing and other sound data in the audio list. With the sound setting processing, the music inputted (composed) by the player can be generated as background music during the game and also used as a cry of an animal. Next, other game processing not performed in the above steps S581 to S592 (such as, processing for a fight between the player-object and the enemy and processing for character display) is performed in step S593.

Figure 24:
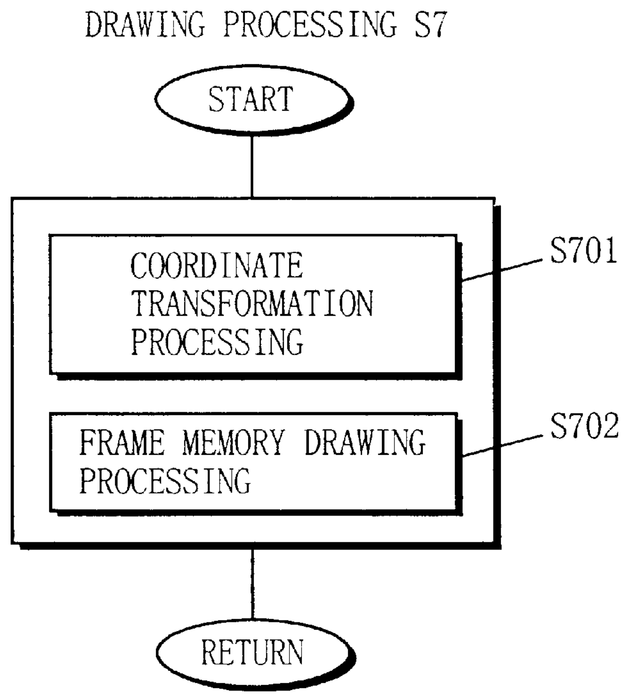
FIG. 24 is a subroutine flow chart showing a detailed operation of drawing processing (step S7) shown in FIG. 8.

Next, the operation of a subroutine of the above described drawing processing (step S7) is described with reference to FIG. 24. First, in step S701, coordinate transformation processing is performed under the control of the RCP 12. In this coordinate transformation processing, each coordinate data of a plurality of polygons of the moving object such as enemies, the player and friends and the still object such as background stored in the image data area 154 of the RAM 15 is transformed into coordinates from a camera viewpoint. Specifically, in order to obtain an image from the viewpoint of the camera, each polygon data constructing a plurality of moving objects and still objects of absolute coordinates is transformed into data of camera coordinates. Next, in step S702, drawing processing is performed in the frame memory. This processing is performed by writing color data determined based on the texture data onto each of triangular surfaces constructing each object specified by polygon coordinates, which are camera coordinates obtained through the above transformation, for each dot of the frame memory area 152. At this time, in order to display frontward (near) objects with priority based on the depth data for each polygon, color data of the near objects is written. Also, depth data corresponding to the dot in which the color data is written is written in the corresponding address of the Z buffer area 153. Then, the procedure returns to step S8 of the main routine in FIG. 8.

The operation in steps S701 and S702 are performed for each frame within a predetermined time and for each polygon constructing the plurality of objects to be displayed on one screen in sequence. The operation is repeated until all objects to be displayed on one screen have been processed.

Next, the operation of a subroutine of the above described audio processing (step S8) is described with reference to FIG. 25. First, in step S801, it is determined whether the audio flag is on or not. When the audio flag is on, the audio data stored in the audio list 158 is read in step S802, and sampled audio digital data to be reproduced within one frame (1/60 second) is outputted to a buffer (not shown). Next, in step S803, the audio generator circuit 16 converts the digital data stored in the buffer into analog signals, and then sequentially outputs these signals to the speaker. Then, the procedure returns to step S9 of the main routine in FIG. 8, and the processing in steps S9 to S12 is performed.

Figure 19:
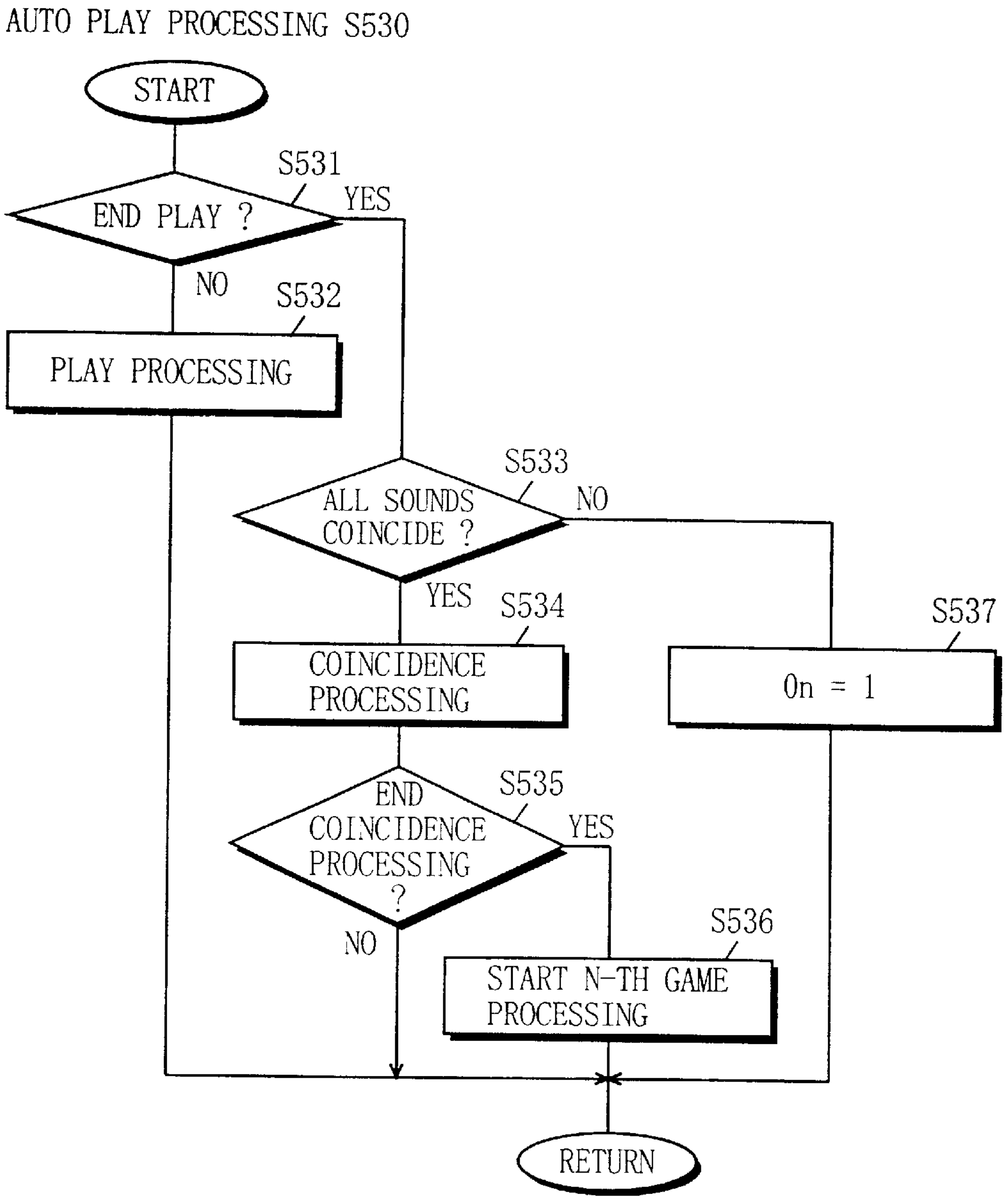
FIG. 19 is a subroutine flow chart showing a detailed operation of auto play processing (step S530) shown in FIG. 12.

Note that a plurality of frequency data corresponding to music inputted through the operation of the controller 40 are registered in the audio list 158 during the auto play processing shown in FIG. 19 or the free play processing shown in FIG. 20 as described above. Therefore, such frequency data is sequentially read from the audio list 158 in a predetermined cycle (steps S801, S802), converted into analog signals during this audio processing, and, as a result, produced as music.

INDUSTRIAL APPLICABILITY

As described above, the sound generating device according to the preferred exemplary embodiment of the present invention is preferably applied to electronic equipment such as video game devices, personal computers, and electronic musical instruments. Especially when used for video game devices, the present sound generating device can achieve a video game that is rich in variety and much fun by using inputted music information with relation to the progress of the game.

What is claimed is:

1. A sound generating device which generates sounds by specifying the tones with a controller having a plurality of push-button switches and an analog joystick capable of selecting among a plurality of positions, comprising:

a push-button detector that detects one of said plurality of push-button switches that is pressed;

a tone selector that selects a tone corresponding to the push-button detected by said push-button detector;

a tilt amount detector that detects an amount of tilt of said analog joystick, a frequency generator that generates a frequency corresponding to the tone selected by said tone selector, based on the amount of tilt detected by said tilt amount detector and the push-button switch detected by said push-button detector; and an audio signal generator that generates a signal of a sound of the tone corresponding to the frequency generated by said frequency generator said controller having a shape which can be grasped by either one or both hands, a and at least one of said plurality of push-button switches and the analog joystick being arranged to be operable while said controller is grasped.

2. The sound generating device according to claim 1, wherein when said tilt amount detector does not detect the amount of tilt of said analog joystick, said frequency generator generates the frequency corresponding to the tone selected by said tone selector without change, and when said tilt amount detector detects the amount of tilt of said analog joystick, said frequency generator generates the frequency corresponding to the tone selected selected by said tone selector with change according to the detected amount of tilt.

3. The sound generating device according to claim 1, wherein said frequency generator comprises:

a frequency data generator that generates frequency data corresponding to the push-button switch of the tone selected by said tone selector;

a frequency data storage that temporarily stores a plurality of frequency data; and a read/write arrangement that reads the frequency data stored in said frequency data storage or writes the frequency data generated by said frequency data generator into said frequency data storage, when said tilt amount detector does not detect the amount of tilt of said analog joystick, said read/write arrangement writes in said frequency data storage a digital value equivalent to the frequency corresponding to the tone selected by said tone selector, as the frequency data; and when said tilt amount detector detects the amount of tilt of said analog joystick, said read/write arrangement writes in said frequency data storage a digital value equivalent to a frequency obtained by changing the frequency corresponding to the tone selected by said tone selector according to the detected amount of tilt, as the frequency data.

4. The sound generating device according to claim 1, wherein said said frequency generator raises the frequency of the tone within a predetermined tone range as said analog joystick is tilted to one direction; a and lowers the frequency of the tone within a predetermined tone range as said analog joystick is tilted to another direction.

5. The sound generating device according to claim 1, further comprising:

vibrato means for changing a depth value of vibrato according to the amount of tilt detected by said tilt amount detector, said frequency generator generates a frequency corresponding to the tone selected by said tone selector with vibrato added thereto based on the depth value from said vibrato means.

6. A sound generating device that generates music by specifying tones in response to a controller having a plurality of push-button switches and an analog joystick capable of selecting among a plurality of positions, comprising:

a push-button detector that detects depression of said plurality of push-button switches;

a tone selector that selects tones corresponding to the push-button(s) detected by said push-button detector;

a tilt amount detector that detects an amount of tilt of said analog joystick;

a frequency data generator that generates frequency data corresponding to the tone(s) selected by said tone selector with or without change, based on the amount of tilt detected by said tilt amount detector and the pressed push-button switch detected by said push-button detector;

a frequency data storage temporarily storing a plurality of frequency data;

a data writer that periodically and sequentially writes the frequency data generated by said frequency data generator into said frequency data storage;

a data reader that for sequentially reads the frequency data stored in said frequency data storage; and an audio signal generator that generates an audio signal having a frequency corresponding to the frequency data read by said data reader.

7. The sound generating device according to claim 6, wherein said data reader repeatedly reads the frequency data of a predetermined time period stored in said frequency data storage to generate music composed by a player.

8. A video game device displaying an image on a display device and producing sound from a speaker by executing a game program, comprising:

a user-manipulable control interface having a plurality of push-button switches for instructing motion of a player-object on a screen of said display device, and an analog joystick capable of selecting among a plurality of positions and for instructing a moving direction of the player-object;

a player-object image data generator that generates data for displaying an image of said player-object;

a non-player-object image data generator that generates data for display an image of objects other than said player-object;

a push-button detector that detects when one of said plurality of push-button switches is pressed;

a tone selector that selects a tone corresponding to the push-button detected by said push-button detector;

a tilt amount detector that detects an amount of tilt of said analog joystick;

a frequency data generator that generates frequency data corresponding to the tone selected by said tone selector with or without change, based on the amount of tilt detected by said tilt amount detector and the push-button switch detected by said push-button detector;

a frequency data storage temporarily storing a plurality of frequency data;

a data writer that periodically and sequentially writes the frequency data generated by said frequency data generator in said frequency data storage;

a data reader that sequentially reads the frequency data stored in said frequency data storage;

an audio signal generator that generates an audio signal having a frequency corresponding to the frequency data read by said data reader; and display image changer that changes at least one of the image data for the player-object generated by said player-object image data generator and the image data for the non-player-object generated by said non-player-object image data generator based on the audio signal generated by said audio signal generator to change at least one of display states of the player-object and the non-player-object.

9. The video game device according to claim 8, wherein said display image changer changes the display state of said non-player-object.

10. The video game device according to claim 9, wherein said display image changer changes the display state of said non-player-object by moving said player-object to a coordinate position which differs from a present coordinate position to change a background screen of said player-object.

11. The video game device according to claim 8, wherein said display image changer changes the display state of said player-object.

12. The video game device according to claim 8, further comprising:

predetermined melody determinator that determines whether a melody based on the frequency data sequentially read from said data reader is a predetermined melody, and said display image changer that changes at least one of the display states of the player-object and the non-player-object in response to determination by said predetermined melody determinator that the melody is the predetermined melody.

13. The video game device according to claim 12, wherein said predetermined melody determinator temporarily stores melody data inputted through operation of said control interface; when new melody data is inputted through an operation of said control interface a predetermined time beforehand, compares the new melody data with the melody data previously inputted; and when the comparison reveals a predetermined relation, determines that the melody based on the frequency data sequentially read by said data reader is the predetermined melody.

14. The video game device according to claim 8, wherein said game program can execute a first mode and a second mode, in the first mode, at least one of said plurality of push-button switches changes the display state of the player-object, and in the second mode, at least one of said plurality of push-button switches selects a tone for the player-object.

15. A video game device displaying an image on a display device and producing sound from a speaker by executing a game program, comprising:

a control interface operated by a player and having a plurality of push-button switches for instructing motion of a player-object on a screen of said display device;

a player-object image data generator that generates data for displaying an image of said player-object;

a non-player-object image data generator that generates data for displaying an image of at least one object other than said player-object;

a push-button detector that detects whether any of said plurality of push-button switches is pressed;

a tone selector that selects a tone corresponding to the push-button detected by said push-button detector;

a frequency data generator that generates frequency data corresponding to the tone selected by said tone selector;

a frequency data storage that temporarily stores a plurality of frequency data;

a data writer for periodically and sequentially writing the frequency data generated by said frequency data generator in said frequency data storage;

a data reader for sequentially reading the frequency data stored in said frequency data storage;

a sound sequence generator that generates a sound sequence corresponding to the frequency data read by said data reader; and a display image changer, based on comparison between the sound sequence generated by said sound sequence generator and a predetermined pattern, that changes at least one of the display states of the player-object and the non-player-object by changing at least one of the image data for the player-object generated by said player-object image data generator and the image data for said non-player-object generated by said non-player-object image data generator.

16. The video game device according to claim 15, wherein said display image changer changes the display state of said non-player-object by changing a background screen of said player-object so that said player-object moves to a different stage.

17. A recording medium in which a video game program to be executed by an information processing device for displaying an image for a game on a display device and producing sound for the game from a speaker is stored, said information processing device comprising a control interface operated by a player and having a plurality of push-button switches for instructing motion of a player-object on a screen of said display device, said program comprising the steps of:

generating data for displaying an image of the player-object in response to an operation of said control interface;

generating data for displaying an image of at least one further, non-player-object in response to an operation of said control interface;

detecting depression of said plurality of push-button switches and selecting a tone(s) corresponding to the depressed push-button(s);

generating frequency data corresponding to the selected tone;

generating a sound sequence corresponding to said frequency data;

comparing said sound sequence with a predetermined pattern; and based on the comparison, changing at least one of display states of the player-objects and the non-player-object by changing at least one of the image data for said player-object and the image data for said non-player-object.

18. A method of operating a video game playing apparatus having a plurality of controls including an analog joystick, comprising:

(a) selecting a sound in response to user operation of said controls;

(b) changing the frequency of said selected sound in response to operation of said analog joystick and in accordance with an amount of tilt of said analog joystick;

(c) repeating steps (a) and (b) to build a sequence of user-selected sounds; and (d) playing said sound sequence in conjunction with video game graphics.

19. A method of operating a video game playing apparatus having a plurality of controls including a joystick, comprising:

(a) selecting a sound in response to user operation of said controls;

(b) changing the frequency of said selected sound in response to operation of said joystick;

(c) repeating steps (a) and (b) to build a sequence of user-selected sounds;

(d) playing said sound sequence in conjunction with video game graphics;

(e) comparing said sequence of user-selected sounds to a predetermined pattern; and (f) changing the video game graphics based on said comparison.

* * * * *

UNITED STATES PATENT AND TRADEMARK OFFICE

CERTIFICATE OF CORRECTION

PATENT NO. : 6,464,585 B1
DATED : October 15, 2002
INVENTOR(S) : Miyamoto et al.

It is certified that error appears in the above-identified patent and that said Letters Patent is hereby corrected as shown below:

Title page, Item [54] and Column 1, lines 1 and 2,
Please correct the title as follows:

-- SOUND GENERATING SYSTEM AND METHOD AND VIDEO GAME USING THE SAME --

Signed and Sealed this

Fifteenth Day of April, 2003

JAMES E. ROGAN
*Director of the United States Patent and Trademark Office*